US011027631B2

(12) United States Patent
Hoshi et al.

(10) Patent No.: US 11,027,631 B2
(45) Date of Patent: Jun. 8, 2021

(54) VEHICLE SEAT

(71) Applicant: TS TECH CO., LTD., Asaka (JP)

(72) Inventors: Yuichiro Hoshi, Tochigi (JP); Kazuki Kobayashi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/323,409

(22) PCT Filed: Jul. 31, 2017

(86) PCT No.: PCT/JP2017/027655
§ 371 (c)(1),
(2) Date: Feb. 5, 2019

(87) PCT Pub. No.: WO2018/025797
PCT Pub. Date: Feb. 8, 2018

(65) Prior Publication Data
US 2019/0176663 A1      Jun. 13, 2019

(30) Foreign Application Priority Data

Aug. 5, 2016   (JP) .............................. JP2016-154331
Aug. 5, 2016   (JP) .............................. JP2016-154332

(51) Int. Cl.
*B60N 2/56*       (2006.01)
*F16B 19/00*      (2006.01)
(Continued)

(52) U.S. Cl.
CPC .............. *B60N 2/5657* (2013.01); *A47C 7/74* (2013.01); *B60N 2/56* (2013.01); *B60N 2/5621* (2013.01);
(Continued)

(58) Field of Classification Search
CPC ...... B60N 2/5657; B60N 2/56; B60N 2/5621; B60N 2/5635; B60N 2/5642; A47C 7/74; A47C 7/742; A47C 7/744; A47C 7/746
(Continued)

(56) References Cited

U.S. PATENT DOCUMENTS

| 5,924,766 A | * | 7/1999 | Esaki | ........................ A47C 7/74 297/180.13 |
| 5,927,817 A | * | 7/1999 | Ekman | ..................... B60N 2/56 297/180.14 |

(Continued)

FOREIGN PATENT DOCUMENTS

| JP | H01172013 A | 7/1989 |
| JP | H01232200 A | 9/1989 |

(Continued)

OTHER PUBLICATIONS

Extended European Search Report issued for European Patent Application No. 17836902.1, dated Jul. 22, 2019, 9 pages, all the cited references being previously filed in the IDS.
(Continued)

*Primary Examiner* — Syed A Islam
(74) *Attorney, Agent, or Firm* — Hamre, Schumann, Mueller & Larson, P.C.

(57) ABSTRACT

A vehicle seat includes a seat frame including a pan frame (12), a blower, and a bracket (50) configured to attach the blower to the pan frame (12). The bracket (50) is provided with a first engagement portion (110) protruding toward the pan frame (12), and the pan frame (12) is provided with a first engagement hole (12A) in which the first engagement portion (110) is engageable. The first engagement portion (110) includes a first stopper portion (112) configured to be locked to the pan frame (12) when the first engagement portion (110) is engaged in the first engagement hole (12A), and a first elastically deformable portion (113) configured to
(Continued)

deform elastically to allow the first stopper portion (112) to pass through the first engagement hole (12A) when the first engagement portion (110) is inserted into the first engagement hole (12A).

20 Claims, 19 Drawing Sheets

(51) Int. Cl.
| | |
|---|---|
| *B60N 2/68* | (2006.01) |
| *A47C 7/74* | (2006.01) |
| *B64D 11/06* | (2006.01) |
| *B61D 33/00* | (2006.01) |
| *B63B 29/04* | (2006.01) |

(52) U.S. Cl.
CPC ......... *B60N 2/5635* (2013.01); *B60N 2/5642* (2013.01); *B60N 2/5664* (2013.01); *B60N 2/68* (2013.01); *F16B 19/00* (2013.01); *B61D 33/0007* (2013.01); *B63B 29/04* (2013.01); *B63B 2029/043* (2013.01); *B64D 11/0626* (2014.12)

(58) Field of Classification Search
USPC ..................................................... 297/180.14
See application file for complete search history.

(56) References Cited

U.S. PATENT DOCUMENTS

| | | | | |
|---|---|---|---|---|
| 6,179,706 | B1* | 1/2001 | Yoshinori | B60N 2/5635 |
| | | | | 297/180.14 |
| 6,478,369 | B1* | 11/2002 | Aoki | B60H 1/00271 |
| | | | | 297/180.1 |
| 6,786,545 | B2* | 9/2004 | Bargheer | B60J 7/223 |
| | | | | 297/217.1 |
| 7,261,372 | B2* | 8/2007 | Aoki | B60N 2/5657 |
| | | | | 297/180.14 |
| 7,275,984 | B2* | 10/2007 | Aoki | B60N 2/5628 |
| | | | | 297/180.1 |
| 7,487,575 | B2* | 2/2009 | Smith | B60N 2/5825 |
| | | | | 24/297 |
| 8,393,162 | B2* | 3/2013 | Chung | B60N 2/5635 |
| | | | | 62/244 |
| 8,727,434 | B2* | 5/2014 | Sahashi | B60N 2/5635 |
| | | | | 297/180.13 |
| 8,998,311 | B2* | 4/2015 | Axakov | B60N 2/5635 |
| | | | | 297/180.13 |
| 9,694,716 | B2* | 7/2017 | Masuda | B60N 2/62 |
| 10,052,985 | B2* | 8/2018 | Wolas | H05K 7/20409 |
| 10,106,062 | B2* | 10/2018 | Storgato | B60N 2/5657 |
| 10,293,720 | B2* | 5/2019 | Okimura | B60N 2/6009 |
| 10,322,653 | B2* | 6/2019 | Takazaki | B60N 2/5642 |
| 10,399,470 | B2* | 9/2019 | Kobayashi | B60N 2/70 |
| 10,406,950 | B2* | 9/2019 | Yang | B60H 1/00564 |
| 10,471,863 | B2* | 11/2019 | Tsuzaki | B60N 2/565 |
| 10,486,571 | B2* | 11/2019 | Sugiyama | A47C 7/744 |
| 2008/0258523 | A1* | 10/2008 | Santin | B60N 2/5825 |
| | | | | 297/218.2 |
| 2008/0296075 | A1* | 12/2008 | Zhu | B60N 2/5621 |
| | | | | 180/68.1 |
| 2015/0069811 | A1 | 3/2015 | Sachs et al. | |
| 2015/0306999 | A1* | 10/2015 | Awatani | B60N 2/66 |
| | | | | 297/180.14 |
| 2016/0280038 | A1 | 9/2016 | Tanaka et al. | |
| 2017/0036575 | A1 | 2/2017 | Kobayashi et al. | |
| 2018/0361893 | A1* | 12/2018 | Iacovone | B60N 2/5685 |
| 2020/0031257 | A1* | 1/2020 | Okimura | B60N 2/5635 |
| 2020/0079258 | A1* | 3/2020 | Kikuchi | A47C 7/744 |
| 2020/0114790 | A1* | 4/2020 | Okimura | B60N 2/682 |

FOREIGN PATENT DOCUMENTS

| | | |
|---|---|---|
| JP | 2580658 B2 | 2/1997 |
| JP | 2001270392 A | 10/2001 |
| JP | 2009023477 A | 2/2009 |
| JP | 2009150433 A | 7/2009 |
| JP | 2010096312 A | 4/2010 |
| JP | 2011131788 A | 7/2011 |
| JP | 2012092899 A | 5/2012 |
| JP | 2014058318 | 4/2014 |
| JP | 2015023615 A | 2/2015 |
| JP | 2015089682 A | 5/2015 |
| JP | 6582068 B2 * | 9/2019 ......... B60H 1/00564 |
| WO | 2015156218 A1 | 10/2015 |

OTHER PUBLICATIONS

International Search Report issued for International Patent Application No. PCT/JP2017/027655, dated Sep. 26, 2017, 6 pages including English translation.
Office Action issued for Chinese Patent Application No. 201780047292.6, dated Oct. 12, 2020, 17 pages including English translation.
Office Action issued for Japanese Patent Application No. 2019-141910, Dispatch dated Feb. 9, 2021, 10 pages including English translation.

* cited by examiner

FIG.6
(a)
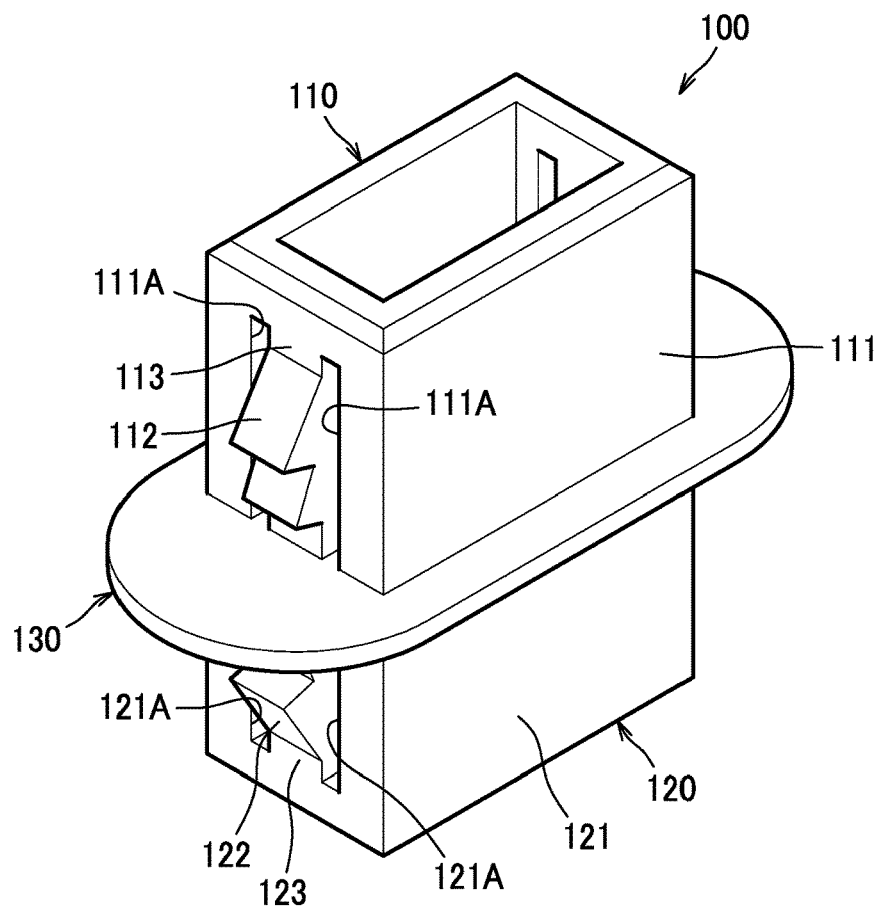
(b)
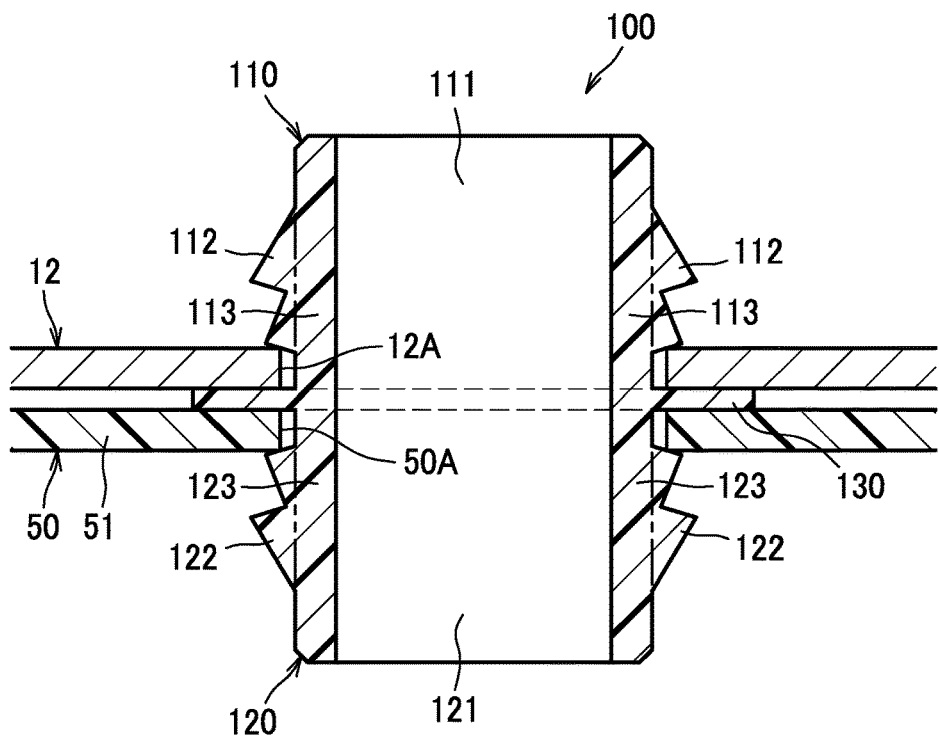

FIG.7
(a)
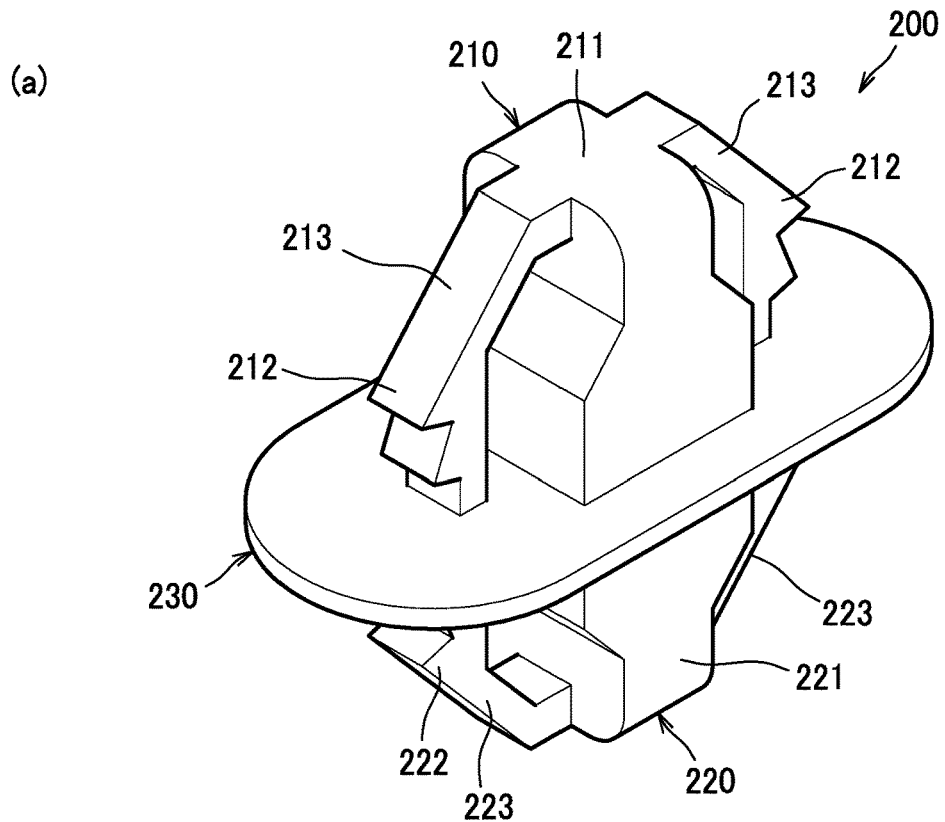
(b)
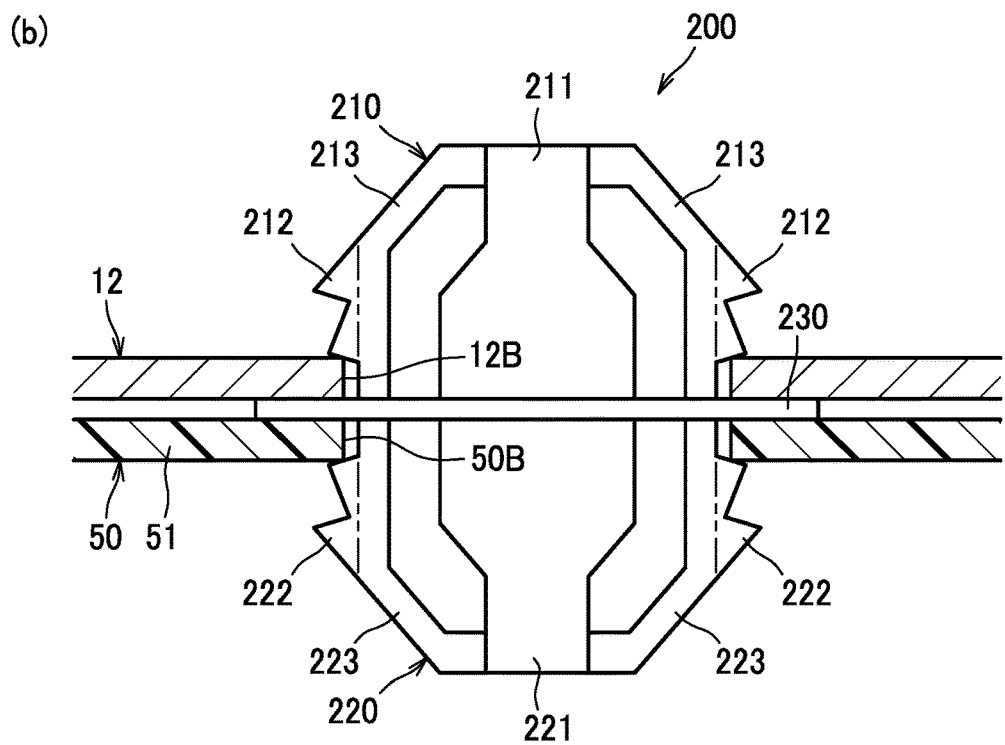

FIG.12
(a)
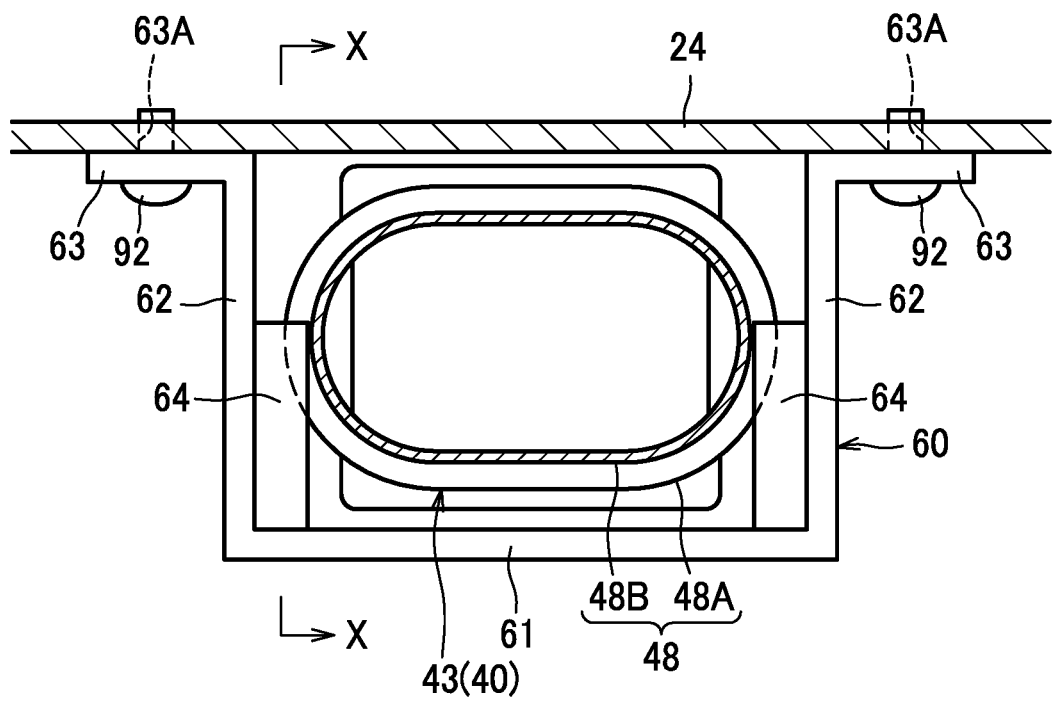
(b)
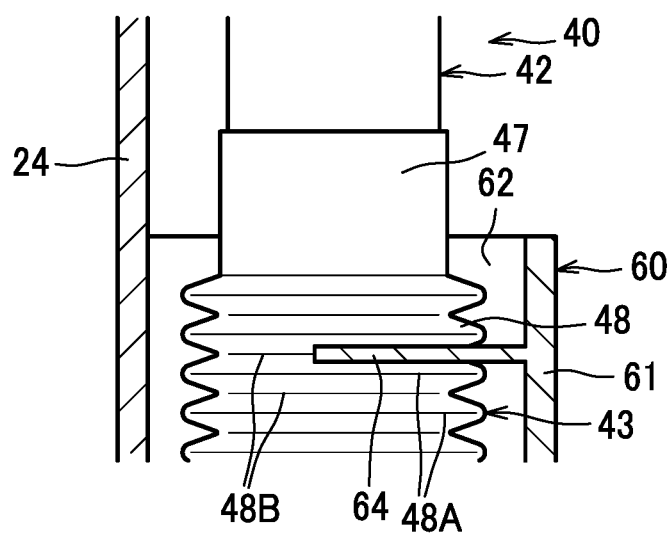

FIG.14
(a)
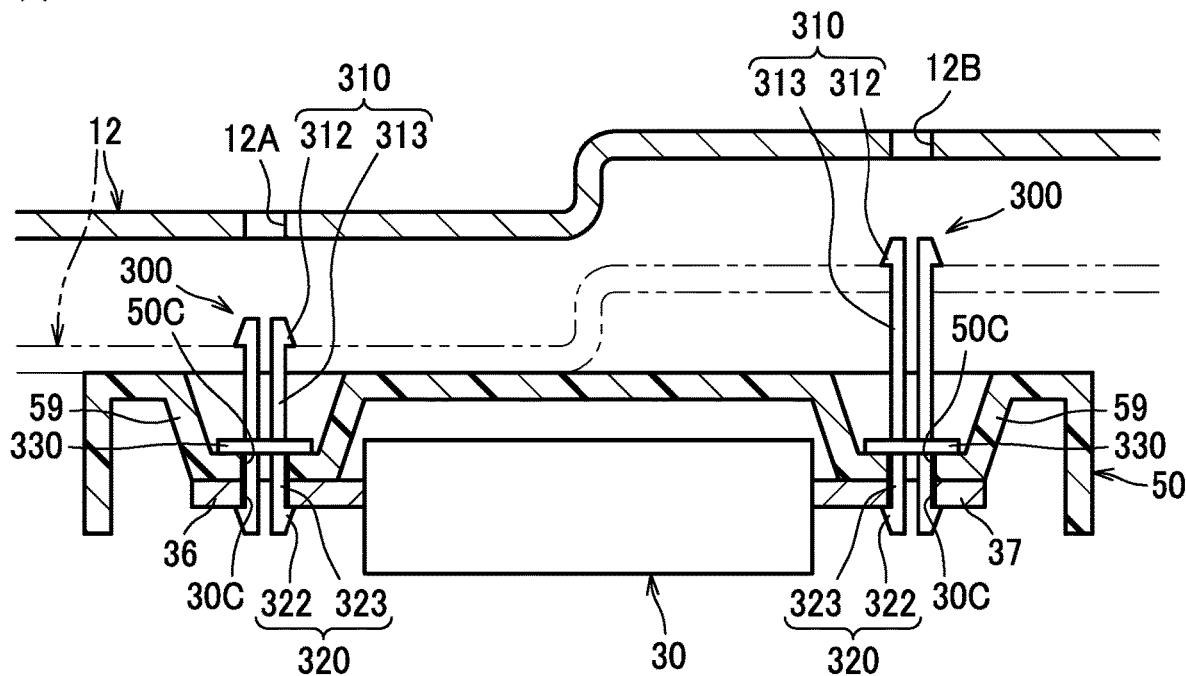
(b)
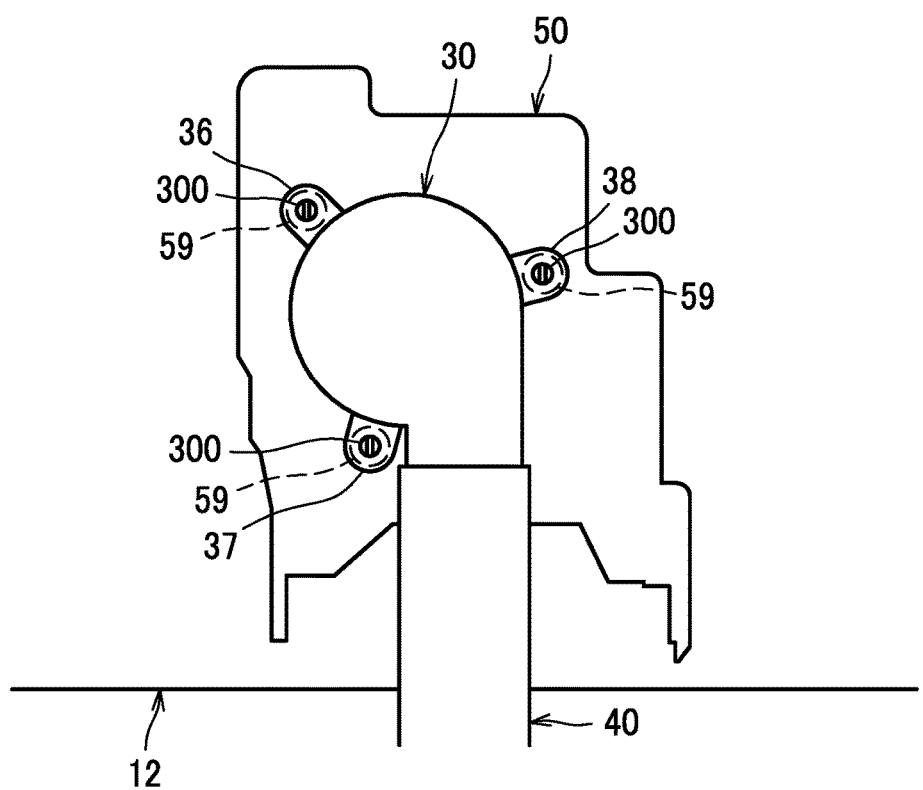

FIG.16
(a)
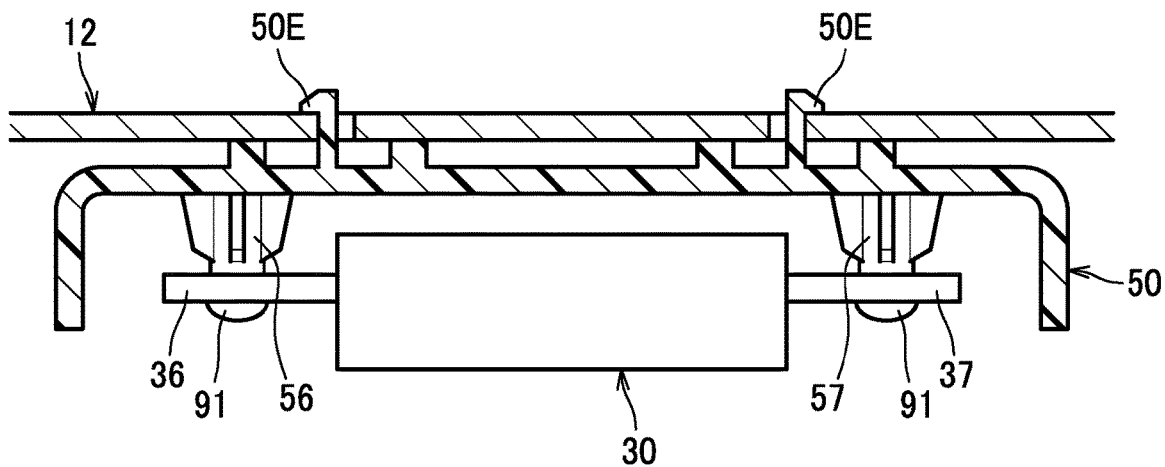
(b)
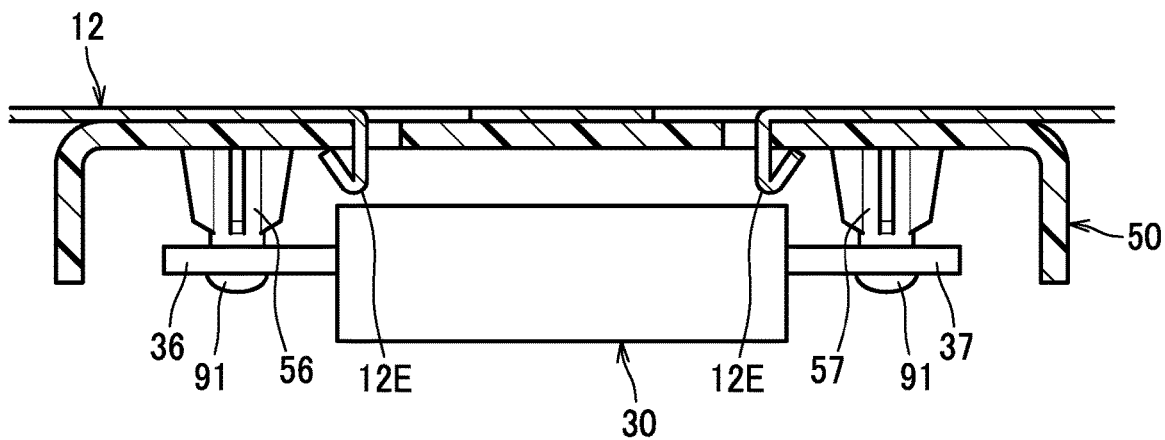

FIG.17
(a)
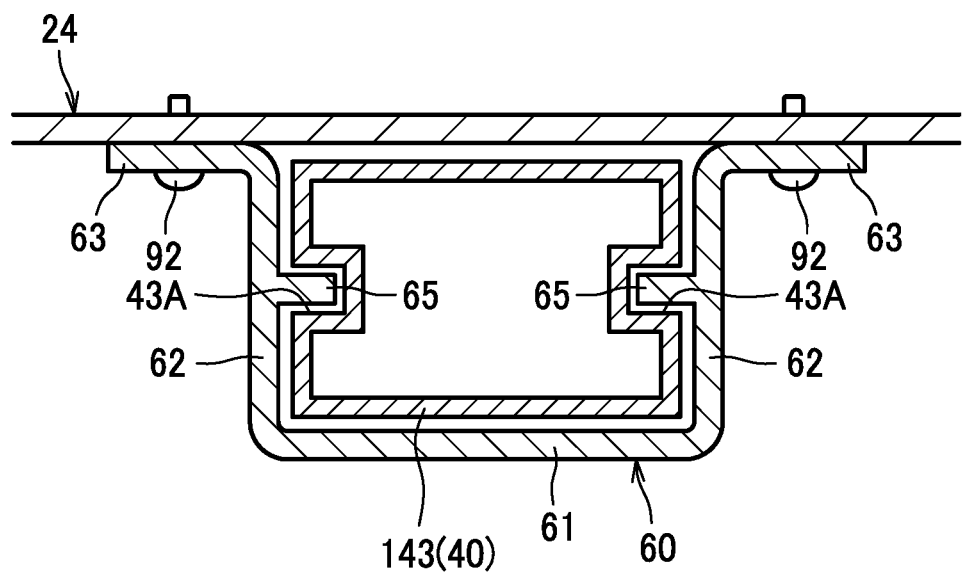
(b)
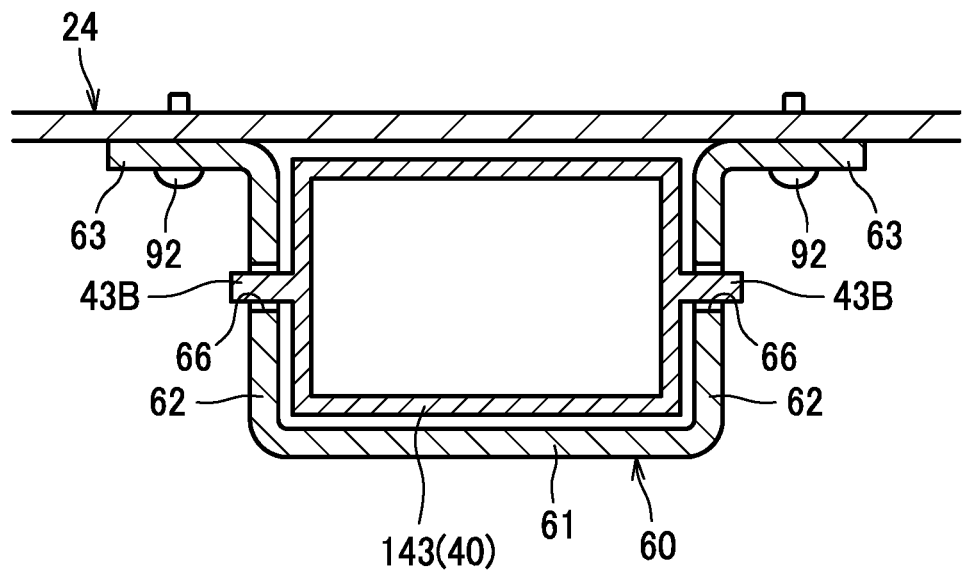

VEHICLE SEAT

TECHNICAL FIELD

The present invention relates to a vehicle seat with a blower.

BACKGROUND ART

A conventionally known vehicle seat provided with a blower is configured to guide air fed from the blower toward an occupant through air outlet ports of a seat cushion. In this vehicle seat, the blower is attached to a plate-like pan frame connecting the right and left side frames of the seat cushion frame through a bracket, for example, as disclosed in Patent Document 1.

Another conventional vehicle seat including a seat cushion and a seat back, each having outlet openings and an air flow passage formed therein, a blower attached to the bottom surface of the seat cushion, and ducts connecting the blower and the air flow passage of the seat back is known, wherein the blower feeds a conditioned air to the outlet openings through the air flow passages and the ducts (see Patent Document 2).

CITATION LIST

Patent Document

Patent Document 1: WO2015/156218
Patent Document 2: Japanese Laid-open Patent Application Publication No. 2009-023477

SUMMARY OF THE INVENTION

According to the configuration as disclosed in Patent Document 1, the attachment of the blower is time-consuming because when the blower is attached to the pan frame, it is necessary that the bracket is attached to the pan frame using tapping screws and that the blower is attached to the bracket using tapping screws.

In view of the above, it is a first object of the present invention to provide a vehicle seat which can improve the workability for attaching the blower to the seat frame.

Further, it is an object of the present invention to provide with ease a portion, by which one of the bracket and a plate portion can be attached to the other one of the bracket and the plate portion.

It is also an object of the present invention to reduce the number of parts for the vehicle seat.

It is also an object of the present invention to improve the stiffness in attachment of the blower.

It is also an object of the present invention to simplify the configuration of the seat frame.

According to the configuration as disclosed in Patent Document 2, the duct is exposed and disposed at the rear side of the seat cushion; this may result in a possibility that, for example, a foot of an occupant seated on the rear seat hits the duct. Further, the duct is retained by the car seat with one end of the duct inserted into an outlet of the blower and with the other end of the duct inserted into the air flow passage of the seat back, so that a middle portion of the duct that is not retained by the car seat may be shifted disadvantageously.

In view of the above, it is a second object of the present invention to provide a vehicle seat which can protect the duct while suppressing a movement of the duct.

Further, it is also an object of the present invention to move the seat cushion and the seat back smoothly.

To attain the first object, a vehicle seat according to the present invention comprises: a seat frame including a plate portion; a blower; a bracket configured to attach the blower to the plate portion, wherein one of the bracket and the plate portion is provided with a first engagement portion protruding toward the other one of the bracket and the plate portion, wherein a first engagement hole in which the first engagement portion is engageable is provided at the other one of the bracket and the plate portion, and wherein the first engagement portion includes a first stopper portion configured to be locked to the other one of the bracket and the plate portion when the first engagement portion is engaged in the first engagement hole, and a first elastically deformable portion configured to deform elastically to allow the first stopper portion to pass through the first engagement hole when the first engagement portion is inserted into the first engagement hole.

With this configuration, the bracket and the plate portion of the seat frame can be attached simply to each other by a single motion, so that the workability for attaching the blower to the seat frame can be improved.

The above-described vehicle seat may further comprise an attachment member including the first engagement portion and a second engagement portion, the second engagement portion protruding toward the one of the bracket and the plate portion, wherein the one of the bracket and the plate portion has a second engagement hole in which the second engagement portion is engageable, and wherein the first engagement portion is provided on the one of the bracket and the plate portion when the second engagement portion is engaged in the second engagement hole to attach the attachment member to the one of the bracket and the plate portion.

With this configuration, the degree of flexibility in designing the first engagement portion is relatively high as compared with an alternative configuration in which the first engagement portions is formed in one-piece with one of the bracket and the plate portion. This makes it possible, for example, to make the first engagement portion have a shape that allows easier engagement in the first engagement hole, so that the workability for attaching the blower to the seat frame can be improved further.

In the above-described vehicle seat, the second engagement portion may comprise a second stopper portion configured to be locked to the one of the bracket and the plate portion when the second engagement portion is engaged in the second engagement hole, and a second elastically deformable portion configured to deform elastically to allow the second stopper portion to pass through the second engagement hole when the second engagement portion is inserted into the second engagement hole.

With this configuration, the attachment member can be attached simply to one of the bracket and the plate portion by a single motion, so that the first engagement portion can be provided on one of the bracket and the plate portion in a simple manner.

In the above-described vehicle seat, the second engagement hole may be a through hole formed in the bracket, and the blower may have a third engagement hole engageable with the second engagement portion having been engaged in the second engagement hole.

With this configuration, the blower can be attached to the bracket using the attachment member, so that the workability for attaching the blower to the seat frame can be improved, for example, as compared with an alternative configuration in which the blower is attached to the bracket by fastening with tapping screws or other fastening members. Further, since the tapping screws or other fastening members for attaching the blower to the bracket are not required, the number of parts for the vehicle seat can be reduced.

In the above-described vehicle seat, the bracket may have three projections protruding toward the blower, and the second engagement hole may be formed in each of the projections.

With this configuration, the three projections are brought into abutment against the blower when the blower is attached to the bracket by engaging the second engagement portion of the attachment member in the second engagement hole of the bracket and further in the third engagement hole. Accordingly, the blower is less likely to rattle, so that the stiffness in attachment of the blower can be improved.

In the above-described vehicle seat, the first engagement portion may be formed in one-piece with the one of the bracket and the plate portion.

With this configuration, the number of parts for the vehicle seat can be reduced.

In the above-described vehicle seat, the first engagement portion may be provided on the plate portion, and the first engagement hole may be a through hole formed in the bracket. Further, the blower may have a fourth engagement hole engageable with the first engagement portion having been engaged in the first engagement hole.

With this configuration, the bracket and the blower can be attached to the plate portion by engaging the bracket and the blower with the first engagement portion; this can improve the workability for attaching the blower to the seat frame, for example, as compared with an alternative configuration in which the blower is attached to the seat frame by fastening with tapping screws or other fastening members. Further, since the tapping screws or other fastening members for attaching the blower to the seat frame are not required, the number of parts for the vehicle seat can be reduced.

In the above-described vehicle seat, the bracket may have three projections protruding toward the blower, and the first engagement hole may be formed in each of the projections.

With this configuration, the three projections are brought into abutment against the blower when the bracket and the blower are attached to the plate portion by engaging the first engagement portion of the plate portion in the first engagement hole of the bracket and further in the fourth engagement hole of the blower. Accordingly, the blower is less likely to rattle, so that the stiffness in attachment of the blower can be improved.

In the above-described vehicle seat, the plate portion may have a plurality of attachment holes for attachment of members, and one of the attachment holes may be used as the first engagement hole.

With this configuration, it is not necessary to form the first engagement hole other than the attachment holes. This can simplify the configuration of the seat frame.

In the above-described vehicle seat, the plate portion may have a plurality of attachment holes for attachment of members, and one of the attachment holes may be used as the second engagement hole.

With this configuration, it is not necessary to form the second engagement hole other than the attachment holes. This can simplify the configuration of the seat frame.

To attain the second object, a vehicle seat according to the present invention comprises: a seat cushion including a first air flow passage, a seat back including a second air flow passage, a blower, a duct connecting the first air flow passage and the second air flow passage to the blower, and a seat frame constituting frameworks of a seat cushion and a seat back, wherein the duct includes a connecting tubular portion disposed to bridge between the seat cushion and the seat back, and wherein the vehicle seat further comprises a cover member, the cover member being configured to cover at least a part of the connecting tubular portion and to be fixed to the seat frame so that a position of the connecting tubular portion is restricted by the cover member.

With this configuration in which the cover member for covering the connecting tubular portion of the duct is provided, the duct can be protected by the cover member. Further, the cover member restricts the position of the connecting tubular portion as it is fixed to the seat frame, the motion of the duct can be suppressed by the cover member.

In the above-described vehicle seat, the connecting tubular portion may include a flexible portion having flexibility, and the cover member may be provided to cover at least a part of the flexible portion.

With this configuration, since the cover member is provided for covering the flexible portion that is easy to move and susceptible to damage as compared to other portions when a foot of the occupant seated on the rear seat hits the flexible portion, the cover member can efficiently provide the protection of the duct as well as the suppression of the movement of the duct.

In the above-described vehicle seat, the cover member may include a protruding portion, the protruding portion being configured to protrude inward toward the connecting tubular portion that is disposed in an inner space of the cover member, so that the protruding portion contacts the connecting tubular portion.

With this configuration, the movement of the duct can be suppressed further by the contact between the protruding portion and the connecting tubular portion.

In the above-described vehicle seat, the protruding portion may be provided on each right and left side of the connecting tubular portion so as to sandwich the connecting tubular portion therebetween.

With this configuration, rightward and leftward movements of the duct can be efficiently suppressed by the protruding portions provided at right and left sides of the connecting tubular portion.

In the above-described vehicle seat, the connecting tubular portion may include a bellows portion having crest portions and root portions that are alternately formed one after another, and the protruding portion may be provided to enter one of the root portions of the bellows portion.

With this configuration, since the protruding portion enters the root portion of the bellows portion, the movement of the duct in the lateral direction as well as the movement of the duct in a direction of arrangement of the crest portions (the root portions) of the duct in line can be suppressed. This can further suppress the movement of the duct.

In the above-described vehicle seat, one of the cover member and the connecting tubular portion may have protruding portions located on right and left sides of the connecting tubular portion and configured to protrude toward the other one of the cover member and the connecting tubular portion, and the other one of the cover member and the connecting tubular portion may have recess portions in which corresponding protruding portion are engageable.

With this configuration, the movement of the duct can be suppressed further by the engagement between the protruding portions and the recess portions.

In the above-described vehicle seat, each of the recess portions may have a groove-shape extending in a direction in which the duct extends.

With this configuration, the duct and the cover member are relatively movable in a direction in which the recess portions extend; therefore, the seat cushion and the seat back can be moved smoothly in a movable structure in which one of the seat cushion and the seat back is movable relative to the other one of the seat cushion and the seat back.

In the above-described vehicle seat, the cover member may include a first wall disposed such that the connecting tubular portion is sandwiched between the first wall and the seat frame, and a pair of second walls extending from right and left ends of the first wall toward the seat frame.

With this configuration, the cover member can be formed with a simple structure and provide the protection of the duct as well as the suppression of the movement of the duct.

In the above-described vehicle seat, the cover member may be made of a material harder than that of the connecting tubular portion.

With this configuration, the duct can be protected well by the cover member.

BRIEF DESCRIPTION OF DRAWINGS

FIG. 6 (a) is a perspective view of the first clip, and FIG. 6 (b) is a sectional view of the first clip.

FIG. 7 (a) is a perspective view of the second clip, and FIG. 7 (b) is a front view of the second clip.

FIG. 12 (a) is a view of a lower frame, the duct, and the cover member as viewed from above, and FIG. 12 (b) is a sectional view taken along the line X-X of FIG. 12 (a).

FIG. 14 (a) is a sectional view of an attachment structure for the blower according to a first modified embodiment, and FIG. 14 (b) is a view of the blower and the bracket as viewed from below.

FIG. 17 (a) is a sectional view of the duct and the cover member according to a fifth modified embodiment, and FIG.

17 (b) is a sectional view of the duct and the cover member according to a sixth modified embodiment.

Figure 18:
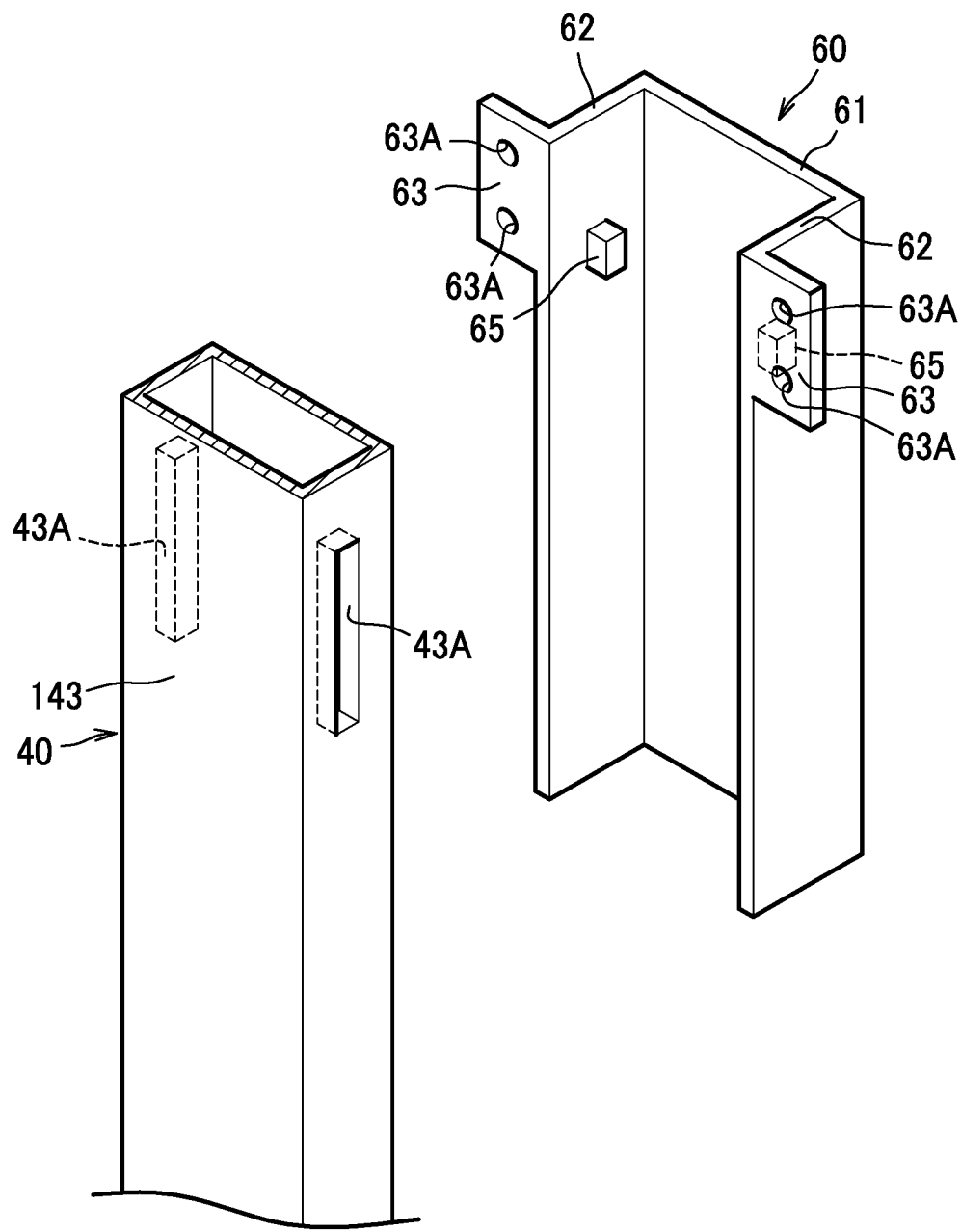

FIG. 18 is a sectional view of the duct and the cover member according to a seventh modified embodiment.

Figure 19:
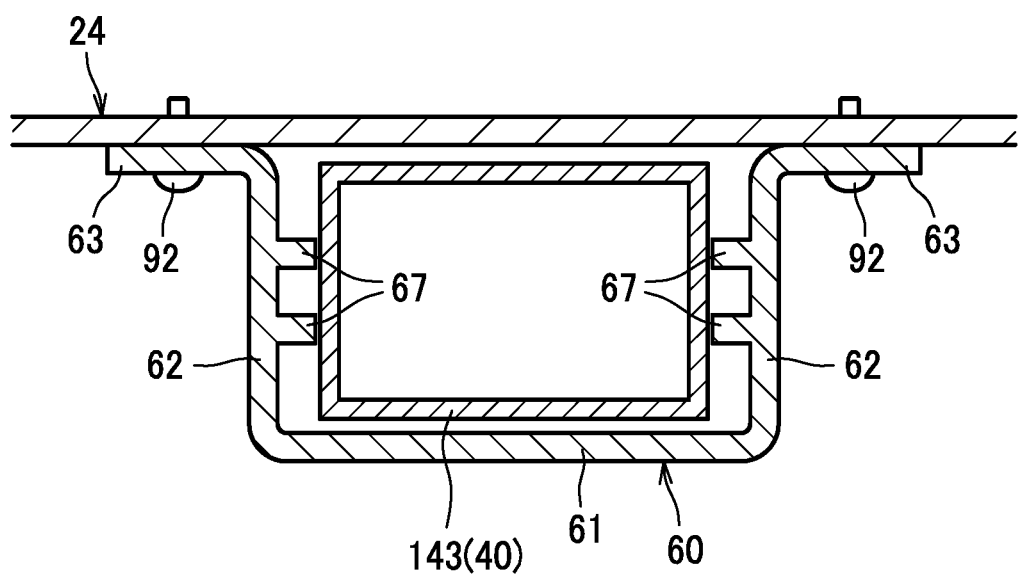

FIG. 19 is a sectional view of the duct and the cover member according to an eighth modified embodiment.

DESCRIPTION OF EMBODIMENTS

One embodiment of the present invention will be described below with reference made to the accompanied drawings. Hereinafter, front/rear (frontward/rearward), right/left (lateral), and upper/lower (upward/downward or vertical) directions are designated as from the view point of an occupant seated on a vehicle seat.

Figure 1:
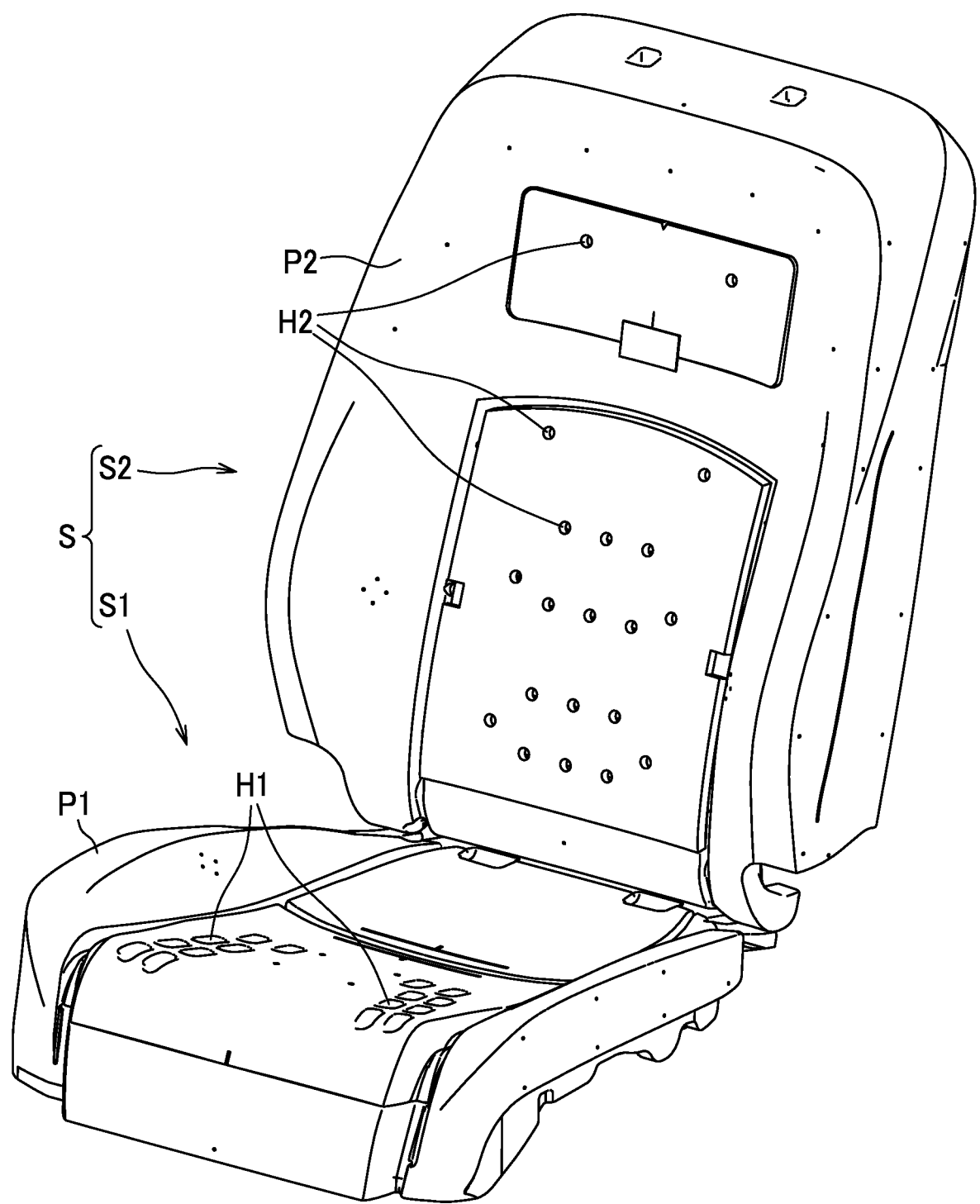
FIG. 1 is a perspective view of a car seat as a vehicle seat according to one exemplary embodiment.

As seen in FIG. 1, a vehicle seat according to this embodiment is configured as a car seat S installed in an automobile, and includes a seat cushion S1 and a seat back S2.

Figure 2:
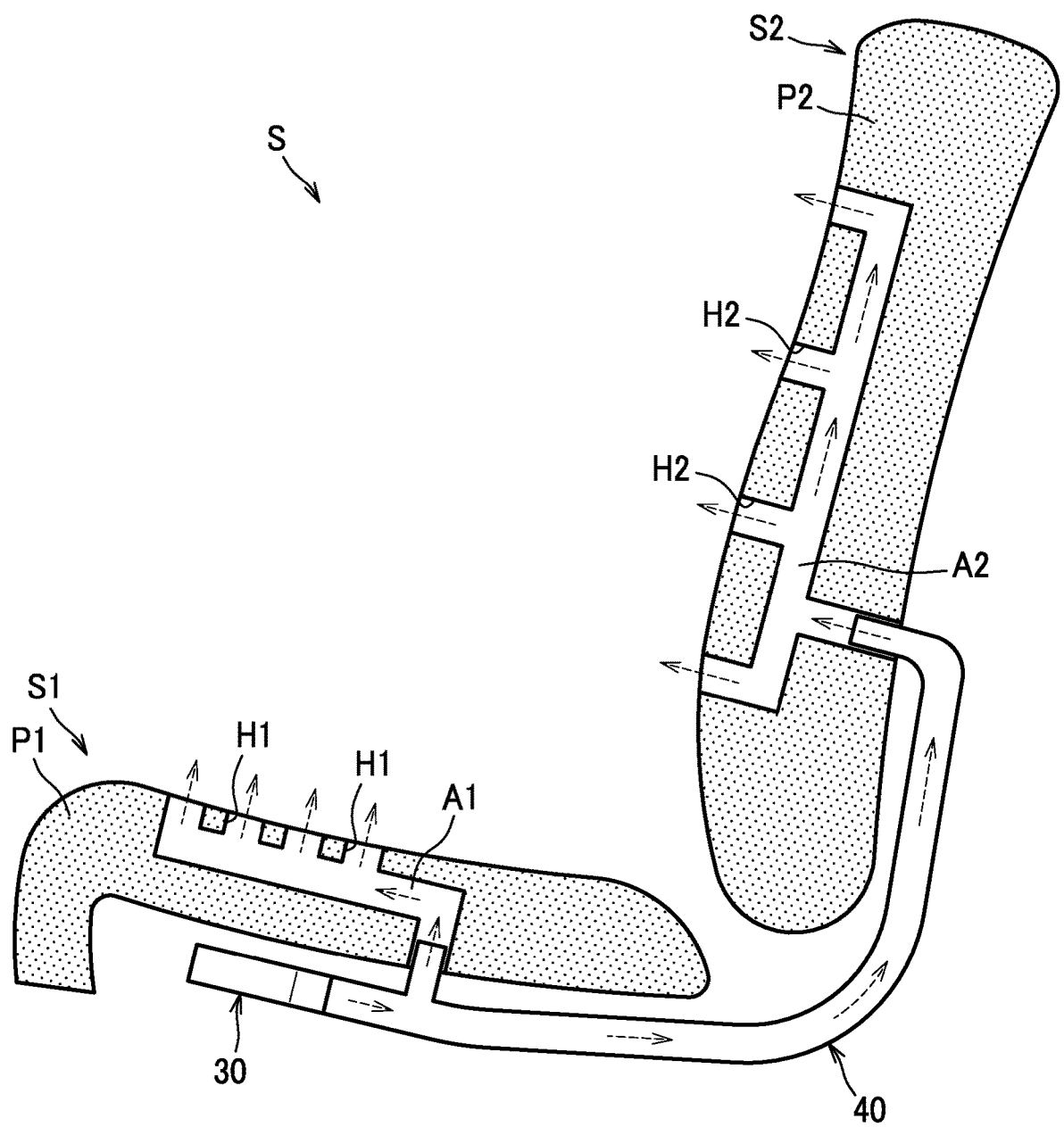
FIG. 2 is a sectional view showing a schematic configuration of the car seat.

The seat cushion S1 includes a cushion pad P1, and the seat back S2 includes a back pad P2. As seen in FIG. 2, the cushion pad P1 has an upper surface in which a plurality of first ventilation holes H1 are formed, and a first air flow passage A1 in communication with the first ventilation holes H1 is formed inside the cushion pad P1. The back pad P2 has a front surface in which a plurality of second ventilation holes H2 are formed, and a second air flow passage A2 in communication with the second ventilation holes H2 is formed inside the back pad P2.

The car seat S further includes a blower 30 disposed under the cushion pad P1, and a duct 40 configured to connect the blower 30 and the air flow passages A1, A2 to establish flow communications therebetween. As seen in the arrow of FIG. 2, the car seat S is configured to allow air blown from the blower 30 to pass through the duct 40 and the air flow passages A1, A2 and blow out from the ventilation holes H1, H2 toward an occupant seated on the car seat S.

Figure 3:
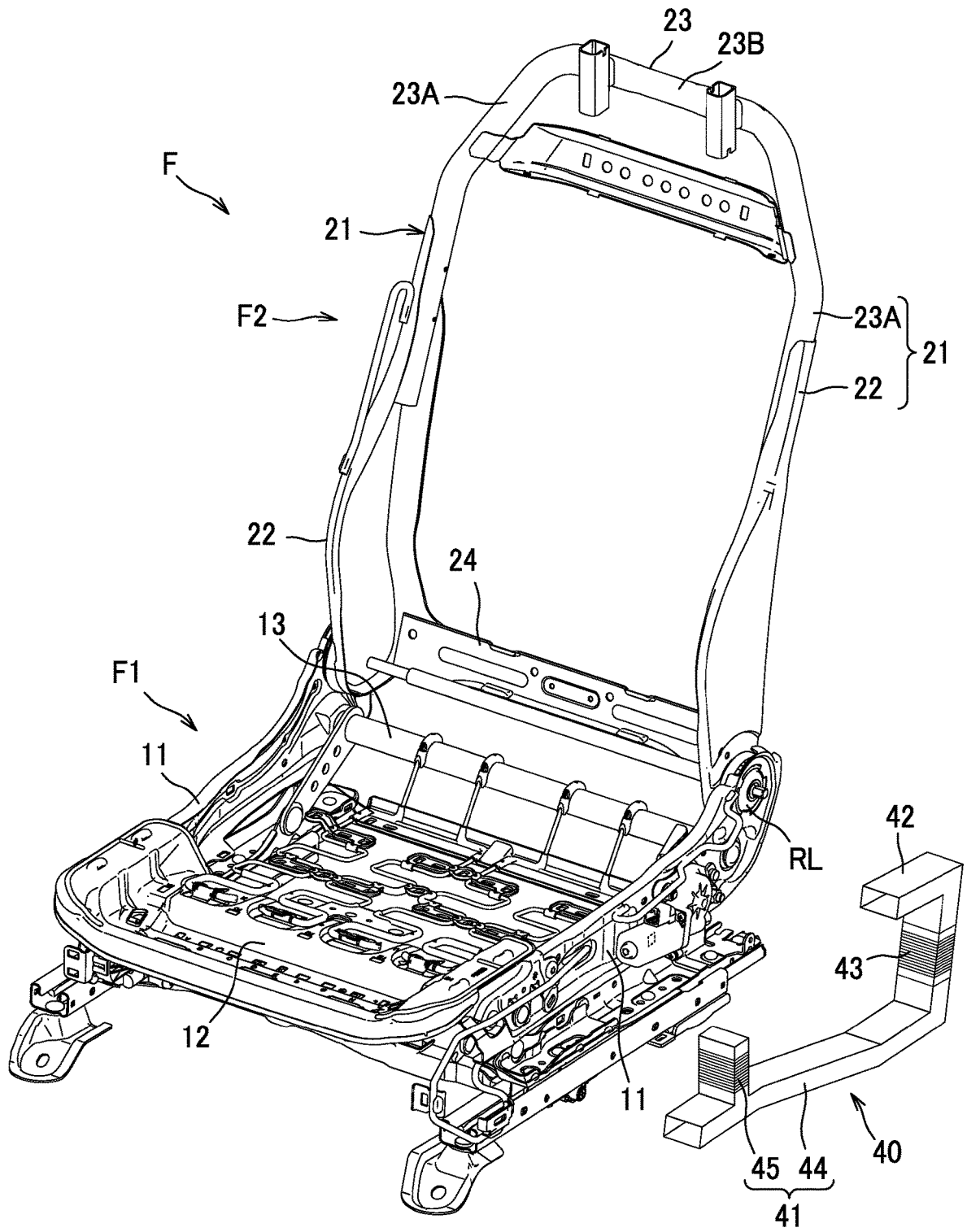
FIG. 3 is a perspective view of a seat frame and a duct.

A seat frame F as seen in FIG. 3 is embedded in the car seat S. The seat frame F includes a seat cushion frame F1 constituting a framework of the seat cushion S1, and a seat back frame F2 constituting a framework of the seat back S2. The seat cushion S1 includes the seat cushion frame F1, the cushion pad P1 that covers the seat cushion frame F1, and an outer skin material having air permeability that covers the cushion pad P1. The seat back S2 includes the seat back frame F2, the back pad P2 that covers the seat back frame F2, and an outer skin material having air permeability that covers the back pad P2.

The seat cushion frame F1 includes cushion side frames 11 as a pair of right and left side frames, a pan frame 12 as a plate member, and a connecting pipe 13.

The cushion side frames 11 are plate members constituting right and left frames of the seat cushion S1. The cushion side frames 11 are disposed laterally spaced apart from each other.

The pan frame 12 is a member connecting front portions of the right and left cushion side frames 11; the pan frame 12 is made by press working sheet metal. The pan frame 12 has right and left end portions that are connected to front end portions of the cushion side frames 11, for example, by welding.

The connecting pipe 13 is a member connecting rear end portions of the right and left cushion side frames 11.

The seat back frame F2 has a lower portion that is rotatably connected to a rear portion of the seat cushion frame F1 through a reclining mechanism RL to allow forward and rearward rotations of the seat back frame F2.

The seat back frame F2 includes a pair of right and left sheet metal frames 22, a pipe frame 23, and a lower frame 24.

The sheet metal frames 22 are disposed laterally spaced apart from each other.

The pipe frame 23 has right and left upper side frames 23A extending approximately in the upper-lower direction, and an upper frame 23B connecting upper end portions of the upper side frames 23A. The right and left upper side frames 23A are connected at their lower portions to upper portions of the sheet metal frames 22 by welding, so that together with the right and left sheet metal frames 22, the right and left upper side frames 23A constitute a pair of back side frames 21.

The lower frame 24 is a member connecting lower portions of the sheet metal frames 22; the lower frame 24 is made by press working sheet metal. The lower frame 24 has right and left end portions that are connected by welding to extension portions of the sheet metal frames 22 that are provided rear ends of the sheet metal frames 22 and extends laterally inward.

Figure 4:
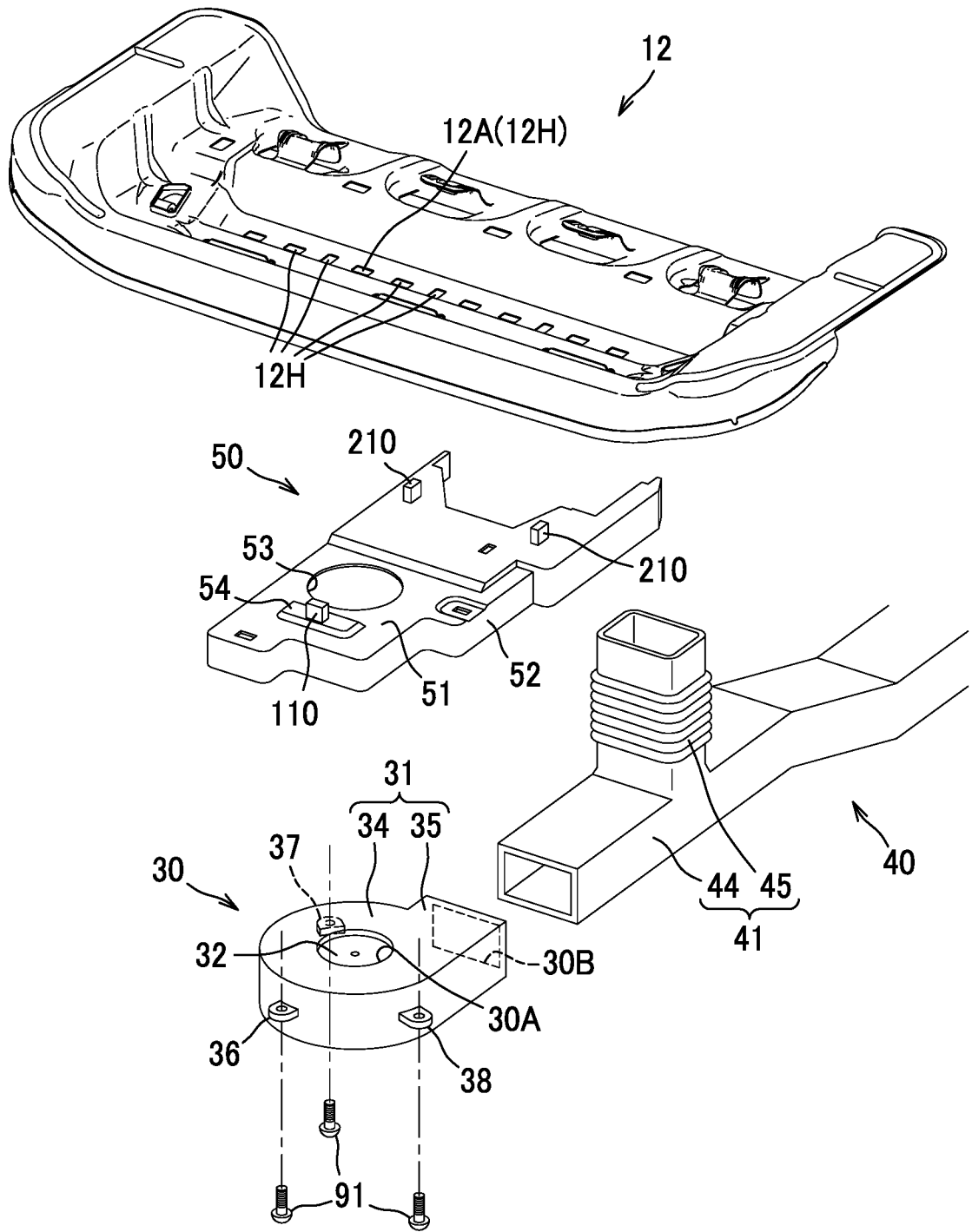
FIG. 4 is a perspective view of a pan frame, a bracket, a blower, and a front end portion of the duct.

As seen in FIG. 4, the blower 30 is a sirocco fan by way of example. The blower 30 includes a casing 31, an impeller 32, and a motor (not shown) for rotating the impeller 32.

The casing 31 includes an accommodating portion 34 for accommodating the impeller 32 and the motor, a tubular outlet portion 35 extending rearward from a left end portion of the accommodating portion 34, and three attachment portions 36, 37, 38 extending radially outward from the accommodating portion 34 having a substantially round shape. The accommodating portion 34 has an upper surface in which an inlet opening 30A for aspiration of air is formed. An outlet opening 30B for blowing out air is formed at a rear end portion of the outlet portion 35. The attachment portion 36 extends in an obliquely frontward and rightward direction from the accommodating portion 34, the attachment portion 37 extends approximately rearward from the accommodating portion 34, and the attachment portion 38 extends in an obliquely frontward and leftward direction from the accommodating portion 34. The attachment portion 36, 37, 38 has a through hole (shown without a reference numeral) for insertion of a tapping screw 91.

The blower 30 is attached to the pan frame 12 through the bracket 50.

The bracket 50 is a member for mounting the blower 30 on the pan frame 12. To explain further, the bracket 50 is a member interposed between the blower 30 and the pan frame 12. According to the invention, the bracket may be provided for purposes other than for fixing the blower to the pan frame. For example, if the pan frame has a step height (i.e., difference in height), a bracket may be provided to level off an attachment surface for the blower, thereby eliminating the height difference. As an alternative, a bracket may be provided to ensure a distance between the blower and the pan frame.

The bracket 50 is made of plastic such as polypropylene; the bracket 50 includes a base wall 51, side walls 52 extending downward from peripheral edge portions of the base wall 51. The base wall 51 has a through opening 53 formed in a position corresponding to the inlet opening 30A of the blower 30, a hollow protruding portion 54 protruding upward at a position frontward of the through opening 53, and three projections 56, 57, 58 (see FIG. 5). The bracket 50 further has first engagement portions 110, 210 protruding upward from the bracket 50 on an upper side of the bracket 50 where the pan frame 12 is to be located.

Figure 5:
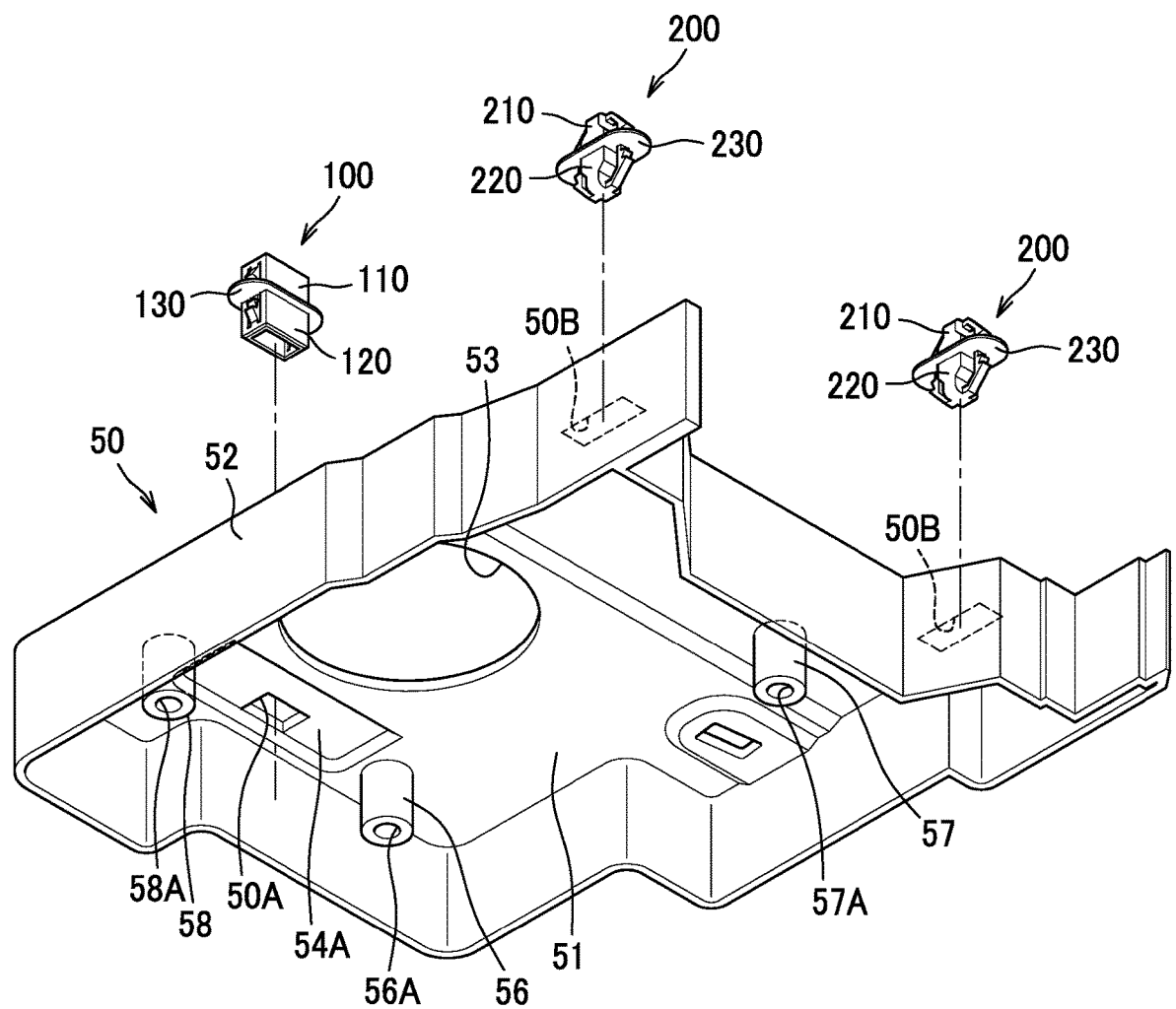
FIG. 5 is a perspective view of a bracket, a first clip, and a second clip as viewed from below.

As see in FIG. 5, the projections 56, 57, 58 are portions protruding downward from the base wall 51 on a lower side of the base wall 51 where the blower 30 is to be located. The projection 56 is provided at a position corresponding to the attachment portion 36 of the blower 30, the projection 57 is provided at a position corresponding to the attachment portion 37, and the projection 58 is provided at a position corresponding to the attachment portion 38. Further, in order to arrange the projections 56, 58 to sandwich a recess portion 54A formed in a reverse side of the protruding portion 54, the projection 56 is provided at the right side of the recess portion 54A and the projection 58 is provided at the left side of the recess portion 54A. The projection 57 is provided at the rear side of the through opening 53. The projection 56, 57, 58 has a screw hole into which a tapping screw 91 (see FIG. 4) is driven. It should be noted that the screw holes 56A, 57A, 58A are pilot holes without female threads, and a tapping screw 91 taps a female thread therein as it is driven into the screw hole 56A, 57A, 58A. However, the screw holes 56A, 57A, 58A may have female threads formed in advance.

The first engagement portions 110, 210 are portions engageable with the pan frame 12. In this embodiment, the first engagement portions 110, 210 are provided on the bracket 50 by attaching a first clip 100 and a second clip 200 as an example of attachment members to the bracket 50.

As seen in FIGS. 6 (a) and 6 (b), the first clip 100 includes a first engagement portion 110, a second engagement portion 120, and a flange portion 130.

The first engagement portion 110 has a first engagement portion main body 111 protruding from the flange portion 130, a first stopper portion 112, and a first elastically deformable portion 113.

The first elastically deformable portion 113 is a portion disposed between two slit holes 111A formed on each end portion of the first engagement portion main body 111 in the longitudinal direction of the flange portion 130. The first elastically deformable portion 113 is configured to be elastically deformable toward the inner side of the first engagement portion 110.

The first stopper portion 112 is a portion that is engaged with the pan frame 12 when the first engagement portion 110 is engaged in a first engagement hole 12A of the pan frame 12. The first stopper portion 112 is provided to protrude outward from the first elastically deformable portion 113 in a direction away from the first engagement portion 110.

The second engagement portion 120 is a portion engageable with the bracket 50. The second engagement portion 120 is provided to protrude opposite the first engagement portion 110 (on the side where the bracket 50 is disposed). The second engagement portion 120 has a second engagement portion main body 121, a second stopper portion 122 that is locked to the bracket 50 when it is engaged in a second engagement hole 50A of the bracket 50, and a second elastically deformable portion 123 disposed between two slit holes 121A and configured to be elastically deformable toward the inner side of the second engagement portion 120. In this embodiment, the first engagement portion 110 and the second engagement portion 120 are formed substantially symmetrical with respect to the flange portion 130.

As seen in FIGS. 7 (a) and 7 (b), the second clip 200 includes a first engagement portion 210, a second engagement portion 220, and a flange portion 230.

The first engagement portion 210 has a first engagement portion main body 211 protruding from the flange portion 230, a first stopper portion 212, and a first elastically deformable portion 213.

The first elastically deformable portion 213 is a portion protruding outward from a distal end of the first engagement portion main body 211 in a longitudinal direction of the flange portion 230, bending toward the flange portion 230, and connecting to the flange portion 230. The first elastically deformable portion 213 is provided one on each side of the first engagement portion main body 211 with the first engagement portion main body 211 being interposed therebetween. The first elastically deformable portion 213 is configured to be elastically deformable toward the first engagement portion main body 211.

The first stopper portion 212 is a portion that is engaged with the pan frame 12 when the first engagement portion 210 is engaged in a first engagement hole 12B of the pan frame 12. The first stopper portion 212 is provided to protrude from the first elastically deformable portion 213 in a direction opposite to the first engagement portion main body 211. The second engagement portion 220 is a portion engageable with the bracket 50.

The second engagement portion 220 is provided to protrude opposite the first engagement portion 210 (on the side where the bracket 50 is disposed). The second engagement portion 220 has a second engagement portion main body 221, a second stopper portion 222 that is locked to the bracket 50 when it is engaged in a second engagement hole 50B of the bracket 50, and a second elastically deformable portion 223 configured to be elastically deformable toward the inner side of the second engagement portion 220. In this embodiment, the first engagement portion 210 and the second engagement portion 220 are formed substantially symmetrical with respect to the flange portion 230.

As seen in FIG. 5, the bracket 50 has second engagement holes 50A, 50B in which the second engagement portions 120, 220 of the clips 100, 200 are engageable. The second engagement holes 50A, 50B are through holes extending through the bracket 50 in the upper-lower direction. The second engagement hole 50A is substantially in the shape of a rectangular oblong in the lateral direction; the second engagement hole 50A is provided in a protruding portion 54 (recess portion 54A) disposed between the projections 56, 58. The second engagement hole 50B is substantially in the shape of a rectangular oblong in the front-rear direction; the second engagement hole 50B is provided one on each right and left side of a rear end portion of the base wall 51 with a space interposed therebetween. The projection 57 is provided between the two second engagement holes 50B, 50B in the lateral direction.

Figure 8:
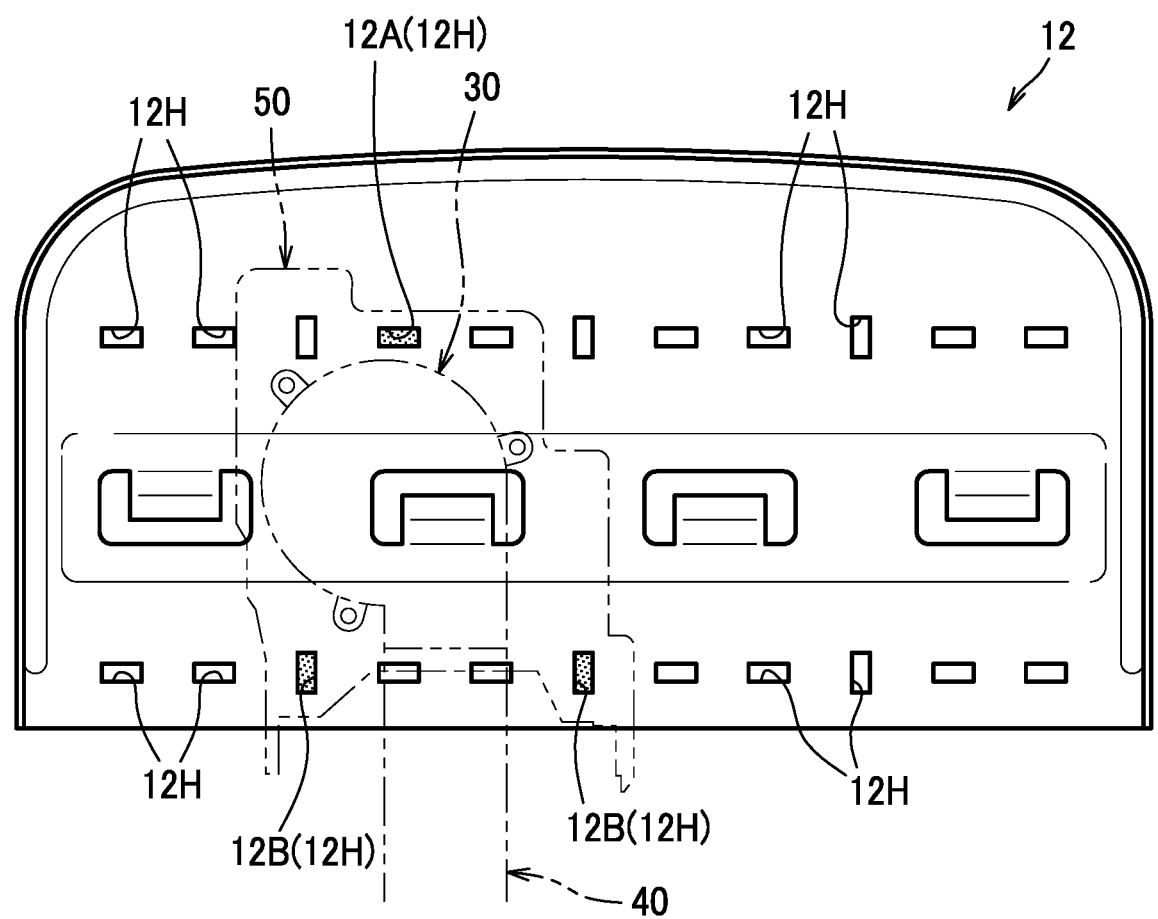
FIG. 8 is a view of the pan frame as viewed from below.

As seen in FIG. 8, the pan frame 12 has first engagement holes 12A, 12B in which the first engagement potions 110, 210 provided on the bracket 50 are engageable. To be more specific, the pan frame 12 has a plurality of attachment holes 12H; in this embodiment, three attachment holes out of a plurality of attachment holes 12H are used as the first engagement holes 12A, 12B. The first engagement hole 12A is a hole substantially in the shape of a rectangular oblong in the lateral direction, and the second engagement hole 50B is a hole substantially in the shape of a rectangular oblong in the front-rear direction.

The attachment holes 12H are holes used for the attachment of wire harnesses for the blower 30 and other electrical equipment; the attachment holes 12H extend through the pan frame 12 in the upper-lower direction. A wire harness is retained by a harness clip and the harness clip is engaged in the attachment hole 12H, thereby the wire harness is attached to the pan frame 12. The attachment holes 12H are modular holes. To be more specific, all the attachment holes 12H are formed as a substantially rectangular in shape having substantially the same size; the attachment holes 12H are disposed laterally substantially at regular intervals. The pan frame 12 has two rows of attachment holes 12H at front and rear sides thereof; each row has a plurality of attachment holes 12H disposed in line in the lateral direction. The attachment holes 12H may be holes used for the attachment of members other than the wire harnesses.

In order to attach the blower 30 to the pan frame 12, as seen in FIG. 5, the clips 100, 200 are first attached to the bracket 50 to provide the first engagement portions 110, 210 on the bracket 50. To be more specific, the second engagement portion 120 of the first clip 100 is engaged in the second engagement hole 50A of the bracket 50, and the second engagement portion 220 of the second clip 200 is engaged in the second engagement hole 50B of the bracket 50. The second engagement portions 120, 220 function similarly to the first engagement portions 110, 210 that are formed substantially symmetrically with respect to the flange portions 130, 230; therefore, a detailed description of the engagement of the first engagement portions 110, 210 to be described later will be substituted for a detailed description of the second engagement portions 120, 220 (reference numerals relating to the second engagement portions 120, 220 are shown in parentheses in FIG. 9).

As the second engagement hole 50A is substantially rectangular in shape oblong in the lateral direction, when the second engagement portion 120 of the first clip 100 engages in the second engagement hole 50A, the first engagement portion 110 is oriented on the bracket 50 such that the longitudinal direction of the flange portion 130 is aligned with the lateral direction. The first engagement portion 110 is oriented in the same direction as the longitudinal direction of the first engagement hole 12A of the pan frame 12. Further, as the second engagement hole 50B is substantially rectangular in shape oblong in the front-rear direction, when the second engagement portion 220 of the second clip 200 engages in the second engagement hole 50B, the first engagement portion 210 is oriented on the bracket 50 such that the longitudinal direction of the flange portion 230 is aligned with the front-rear direction. The first engagement portion 210 is oriented in the same direction as the longitudinal direction of the first engagement hole 12B of the pan frame 12.

Next, the blower 30 is attached to the bracket 50. To be more specific, as seen in FIG. 4, tapping screws 91 are inserted through the corresponding through holes formed in the attachment portions 36, 37, 38 of the blower 30, and driven into the corresponding screw holes 56A, 57A, 58A formed in the projections 56, 57, 58 of the bracket 50 (see FIG. 5) to be threadedly engaged therein. It should be noted that the three projections 56, 57, 58 are brought into abutment on the attachment portions 36, 37, 38 of the blower 30 by attaching the blower 30 to the bracket 50. Accordingly, the blower 30 is less likely to rattle, so that the stiffness in attachment of the blower 30 can be improved.

The bracket 50 to which the blower 30 has been fixed is then attached to the pan frame 12. To be more specific, the two first engagement portions 210 at the rear side of the bracket 50 are first engaged in the first engagement holes 12B of the pan frame 12 (see FIG. 8). Thereafter, the first engagement portion 110 at the front side of the bracket 50 is engaged in the first engagement hole 12A of the pan frame 12.

Figure 9:
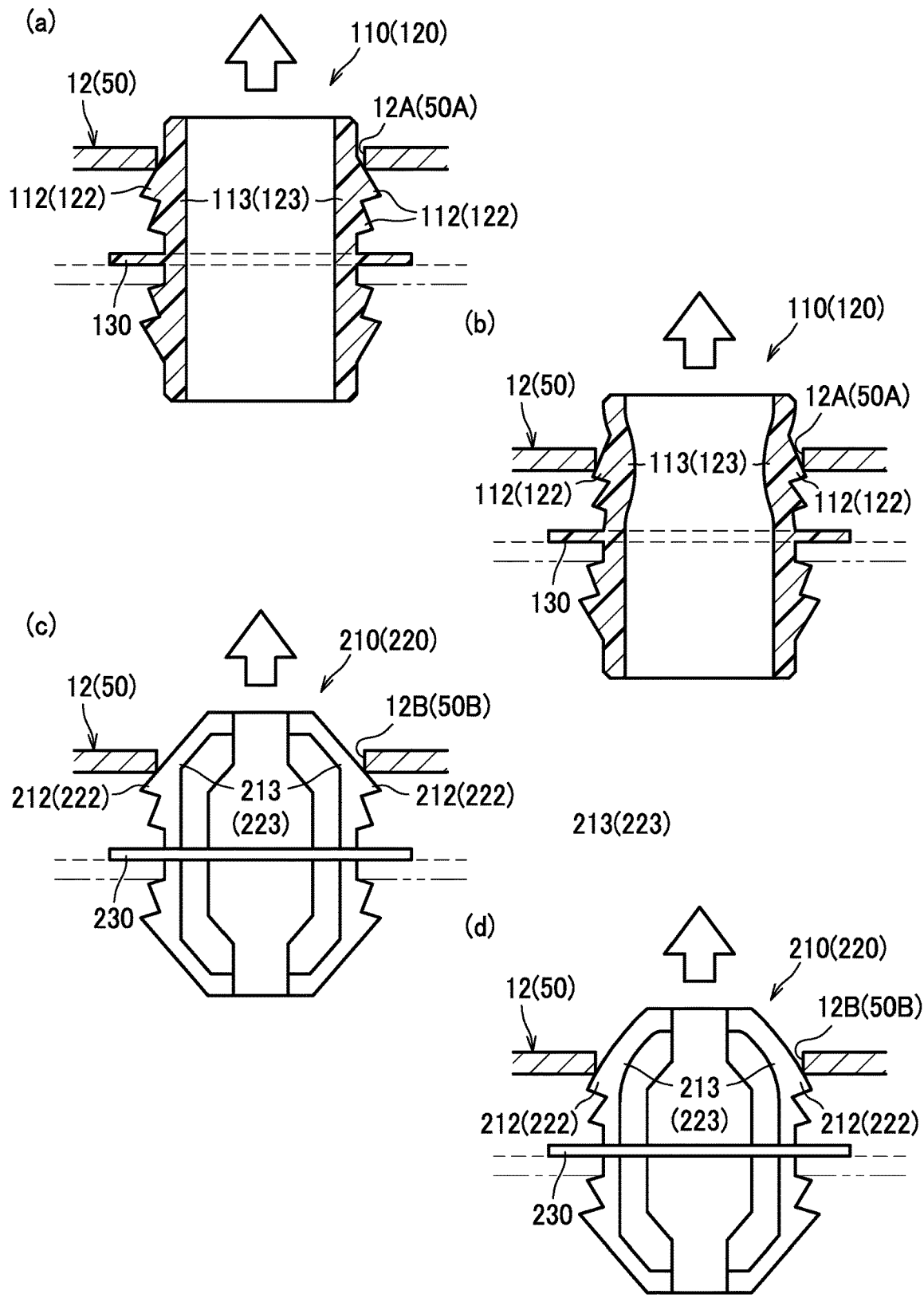
FIG. 9 (a) and FIG. 9 (b) are views showing the engagement of an engagement portion of the first clip into an engagement hole, and FIG. 9 (c) and FIG. 9 (d) are views showing the engagement of an engagement portion of the second clip into an engagement hole.

As seen in FIGS. 9 (a) and 9 (c), when the first engagement portion 110, 210 is engaged in the first engagement hole 12A, 12B, a distal end portion of the first engagement portion 110, 210 is inserted into the first engagement hole 12A, 12B and the first stopper portions 112, 212 are brought into abutment on the lower surface of the peripheral portion of the first engagement hole 12A, 12B of the pan frame 12. If the first engagement portion 110, 210 is pressed further from this state, as seen in FIGS. 9 (*b*) and 9(*d*), the first elastically deformable portions 113, 213 deform to allow the insertion of the first engagement portion 110, 210 into the first engagement hole 12A, 12B. After that, when the first stopper portions 112, 212 pass completely through the first engagement hole 12A, 12B, the first elastically deformable portions 113, 213 return to their original shapes from their deformed shapes; accordingly, as seen in FIGS. 6 (*b*) and 7 (*b*), the first stopper portions 112, 212 are locked to the upper surface of the peripheral portion of the first engagement hole 12A, 12B of the pan frame 12.

Accordingly, the blower 30 can be attached to the pan frame 12 through the bracket 50. It should be noted that the attachment of the first clip 100, the second clip 200, and the blower 30 to the bracket 50 may be in any order. Further, it should be noted that the engagement of the first engagement portions 110, 210 with the pan frame 12 may be done in the reverse order as that described above.

As seen in FIG. 3, the duct 40 includes a cushion tubular portion 41, a back tubular portion 42, and a connecting tubular portion 43.

Figure 10:
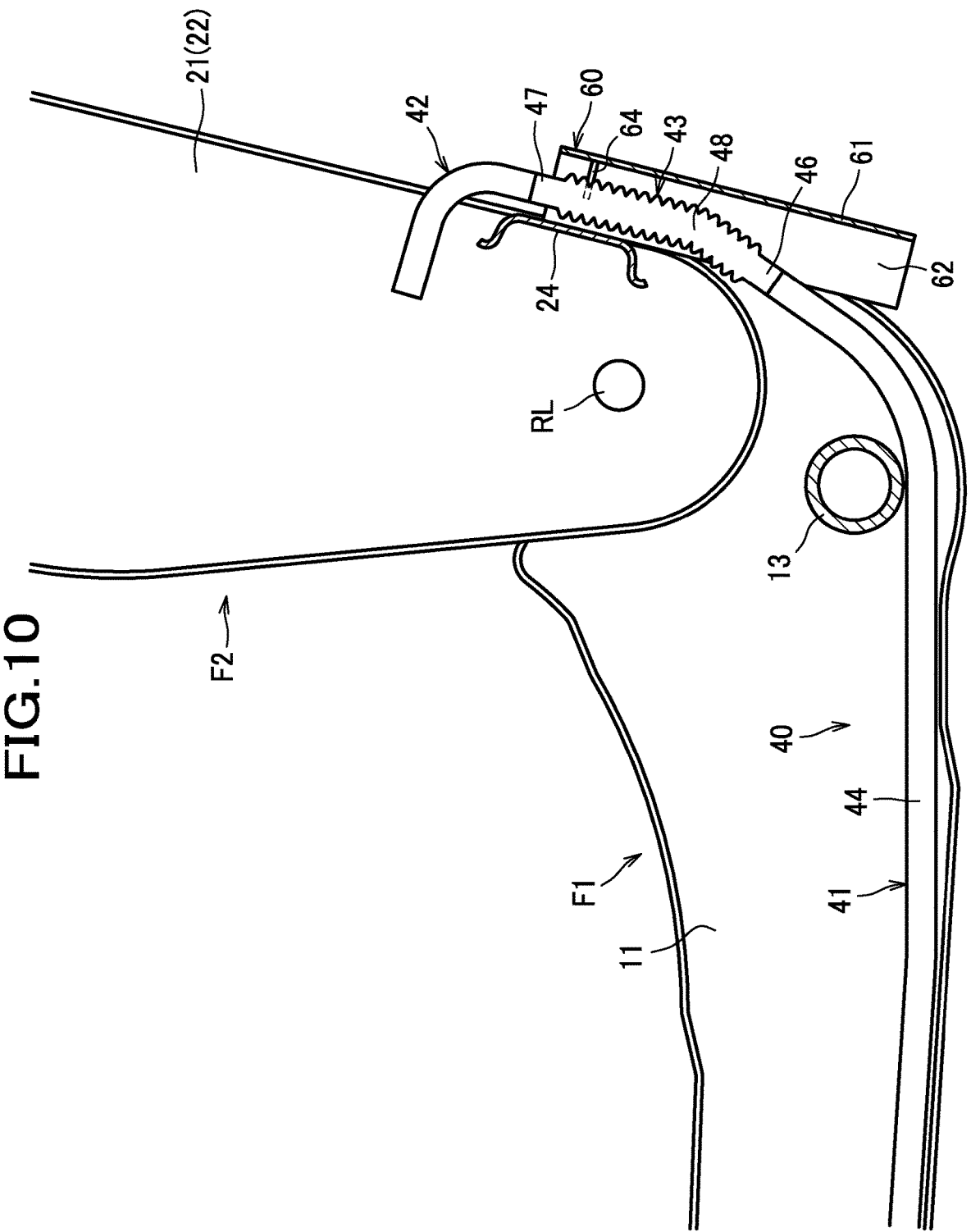
FIG. 10 is a view of the seat frame, the duct, and a cover member as viewed from the left side.

The cushion tubular portion 41 is made of plastic such as polypropylene and polyethylene. The cushion tubular portion 41 includes a first tubular portion 44 and a second tubular portion 45. As seen in FIG. 10, the first tubular portion 44 extends substantially in the front-rear direction and is disposed to pass under the cushion pad P1 (not shown in FIG. 10); the first tubular portion 44 has a rear end portion bent upward at around the underside of the connecting pipe 13 and disposed at the rear side of the connecting pipe 13. The first tubular portion 44 has a front end connected to the outlet portion 35 of the blower 30 (see FIG. 4) and a rear end connected to the connecting tubular portion 43. As seen in FIG. 4, the second tubular portion 45 is provided to be bifurcated from the front end portion of the first tubular portion 44 and extend upward; the second tubular portion 45 has an upper end connected to the first air flow passage A1 of the cushion pad P1.

Returning to FIG. 10, the back tubular portion 42 is made of plastic such as polypropylene and polyethylene. The back tubular portion 42 has a lower end portion extending substantially in the upper-lower direction and disposed at the rear side of the lower frame 24, and an upper end portion bent frontward and extending to pass above the lower frame 24. The back tubular portion 42 has a lower end connected to the connecting tubular portion 43, and an upper end connected to the second air flow passage A2 of the back pad P2.

The connecting tubular portion 43 is a portion connecting the cushion tubular portion 41 and the back tubular portion 42. The connecting tubular portion 43 is made of a material such as olefinic elastomer (TPO). The connecting tubular portion 43 is disposed at the rear side of the lower frame 24 so as to bridge between the seat cushion S1 and the seat back S2. The connecting tubular portion 43 includes a first connecting portion 46 to which the cushion tubular portion 41 is connected, a second connecting portion 47 to which the back tubular portion 42 is connected, and a bellows portion 48 as an example of a flexible portion. As seen in FIG. 12 (*b*), the bellows portion 48 has crest portions 48A and root portions 48B that are alternately formed one after another; the bellows portion 48 has flexibility and is freely expandable and contractable.

Figure 11:
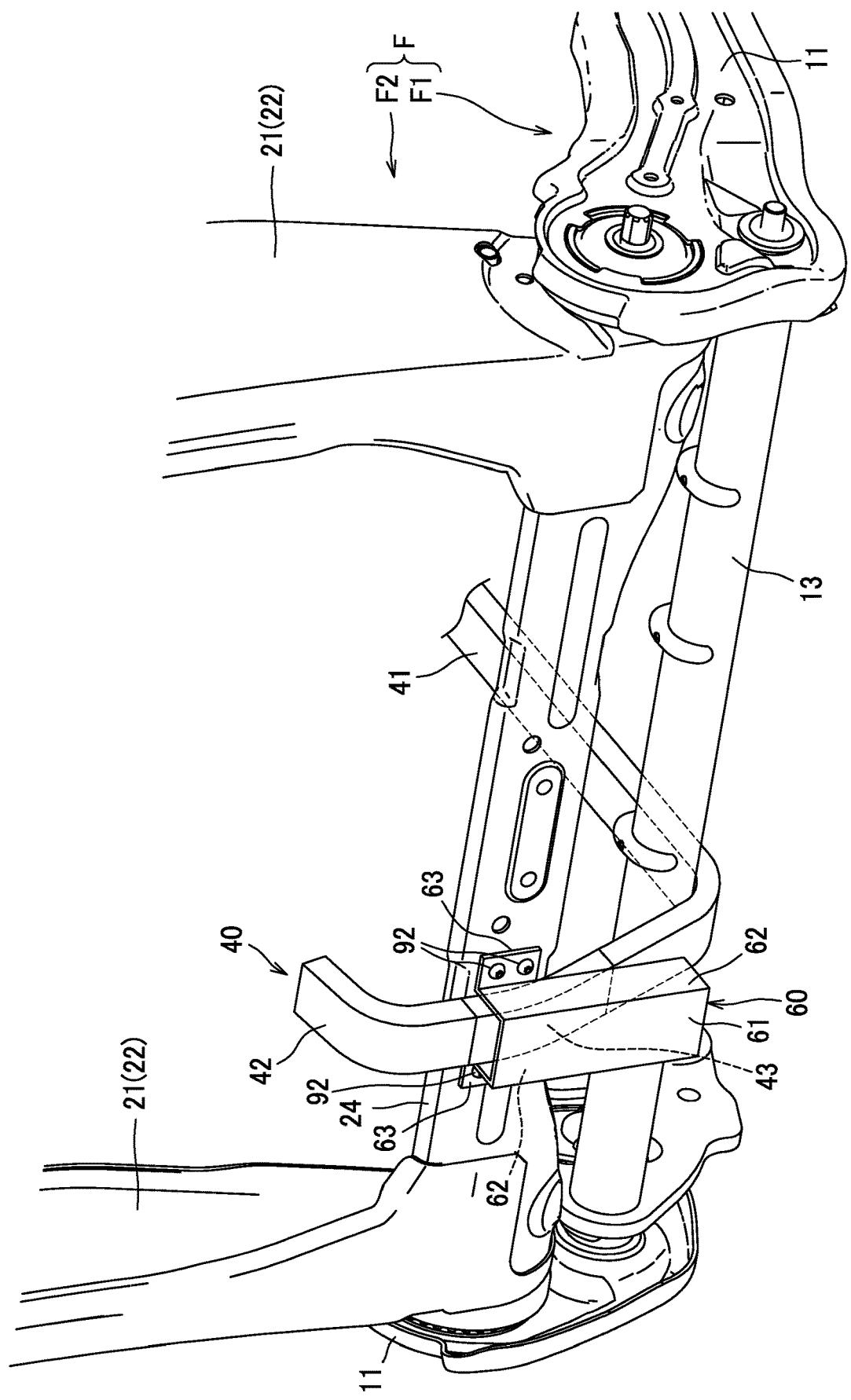
FIG. 11 is a view of the seat frame, the duct, and the cover member as viewed from the rear side.

As seen in FIG. 11, a cover member 60 is attached to the rear side of the seat frame F.

The cover member 60 is made of a plastic material (e.g., polypropylene and polyethylene) harder than that of the connecting tubular portion 43 of the duct 40. The cover member 60 includes a first wall 61, a pair of right and left second walls 62, and a pair of right and left attachment portions 63.

As seen in FIG. 12 (*a*), the first wall 61 is a wall that is disposed at the rear side of the lower frame 24 such that the connecting tubular portion 43 is sandwiched between the first wall 61 and the lower frame 24 constituting the seat frame F. The second walls 62 are walls extending frontward from right and left ends of the first wall 61 toward the lower frame 24. With this configuration, the cover member 60 has a substantially U-shaped cross-section with the front side thereof being open by the first wall 61 and the second walls 62. The first wall 61 and the second walls 62 are formed to extend long in the upper-lower direction from a position at the rear of the lower frame 24 to a position at the rear of the connecting pipe 13 (see FIG. 10).

The attachment portions 63 are portions extending laterally outward from front end portions of upper portions of the second walls 62. Each attachment portion 63 has two through holes 63A for the insertion of screws 92; the two through holes are arranged in line in the upper-lower direction.

As seen in FIGS. 12 (*a*) and 12 (*b*), the cover member 60 includes rib-like protruding portions 64 within an inner space where the connecting tubular portion 43 is disposed. To be more specific, the protruding portions 64 are provided to protrude from the inner surfaces of the right and left second walls 62 in laterally inward directions. Accordingly, the protruding portions 64 sandwich the connecting tubular portion 43 at right and left sides of the duct 40 (i.e., the connecting tubular portion 43). Further, the protruding portion 64 enters one of the root portions 48B disposed at an upper end portion of the bellows portion 48 constituting the connecting tubular portion 43 and contacts the inner surface of the root portion 48B (the connecting tubular portion 43). The rear end of the protruding portion 64 is connected to the first wall 61. In other words, the protruding portions 64 are provided to protrude from the corners formed by the first wall 61 and the second walls 62 in the laterally inward directions.

The cover member 60 is fixed to the lower frame 24 by inserting the screws 92 into the through holes 63A formed in the attachment portions 63 and fastening the screws 92 against the lower frame 24; meanwhile, the connecting tubular portion 43 is held within a recess portion formed by the first wall 61 and the second walls 62. Accordingly, the cover member 60 is provided to cover a part of the connecting tubular portion 43 (more specifically, the bellows portion 48) by the first wall 61 and the second walls 62.

The cover member 60 restricts the position of the connecting tubular portion 43 as it is fixed to the lower frame 24. To be more specific, the cover member 60 restricts the position of the connecting tubular portion 43 in the front-rear direction by the lower frame 24 and the first wall 61 because the connecting tubular portion 43 comes into contact with the lower frame 43 and the first wall 61 if the connecting tubular portion 43 tends to move frontward or rearward. Further, the cover member 60 restricts the position of the connecting tubular portion 43 in the right-left direction by the second walls 62 because the connecting tubular portion 43 comes into contact with the right and left second walls 62 (more specifically, the protruding portions 64) if the connecting tubular portion 43 tends to move rightward or leftward.

Further, the cover member 60 restricts the position of the connecting tubular portion 43 by the protruding portions 64 entering the root portion 48B of the bellows portion 48. To be more specific, the cover member 60 restricts the position of the connecting tubular portion 43 in the upper-lower direction by the protruding portions 64 because the inner surface of the root portion 48B comes into contact with the protruding portions 64 if the connecting tubular portion 43 moves upward or downward.

Operations of the cover member 60 and the duct 40 to proceed when the seat back S2 is rotated relative to the seat cushion S1 will be described.

Figure 13:
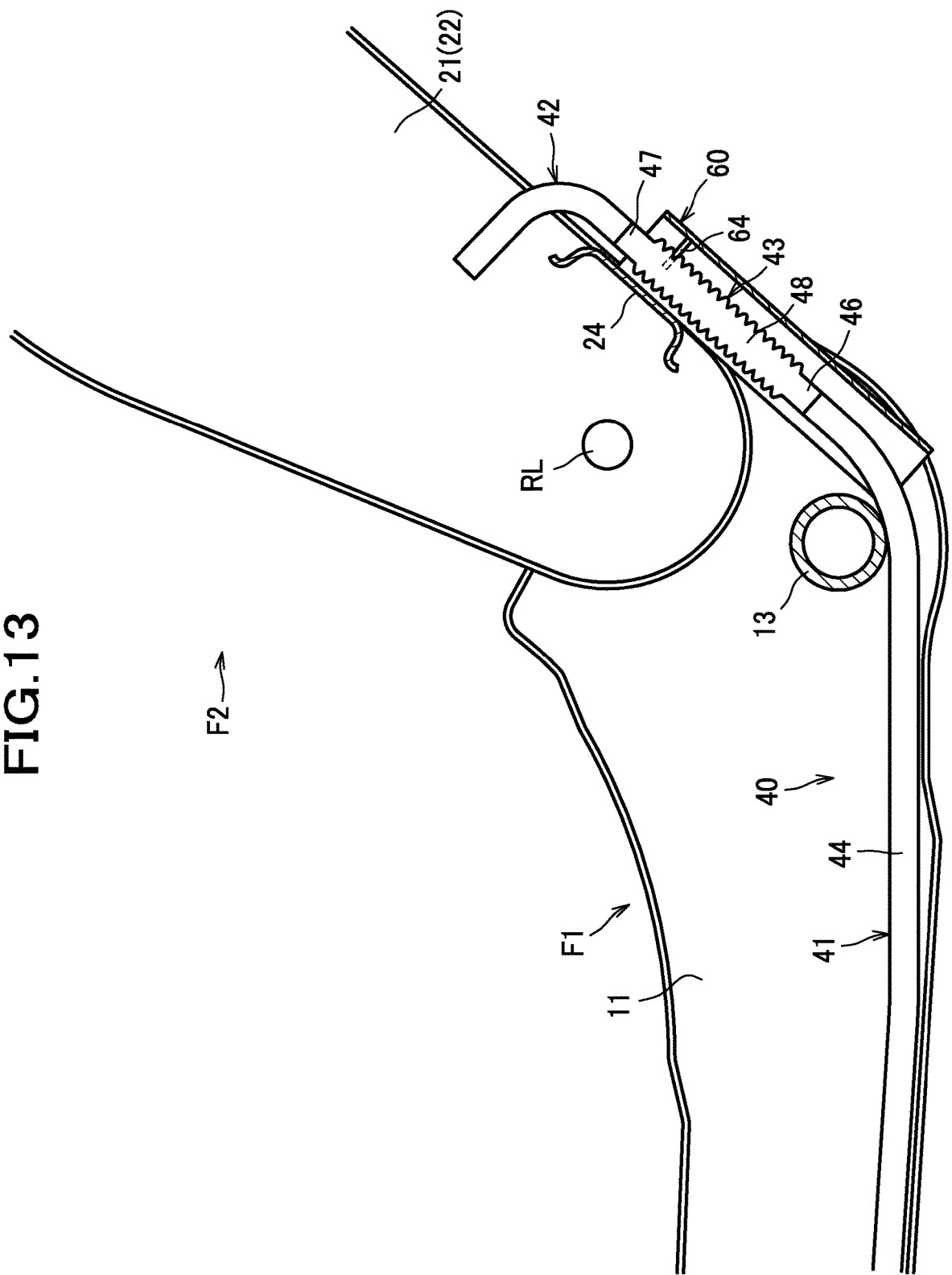
FIG. 13 is a view of the seat frame, the duct, and the cover member as viewed from the left side when the seat back is tilted backward.

When the seat back frame F2 (the seat back S2) is rotated rearward from the position shown in FIG. 10, the cover member 60 fixed to the lower frame 24 is also rotated rearward around an axis of the reclining mechanism RL as shown in FIG. 13. This causes the upper end portion of the duct 40 that is restricted by the lower frame 24 and the cover member 60 to be rotated together with the seat back frame F2 and the cover member 60. Since the right and left protruding portions 64 enter the root portion 48 of the upper end portion of the bellows portion 48 to hold the upper end portion of the bellows portion 48 by the protruding portions 64, when the seat back frame F2 and the cover member 60 are rotated rearward, the upper end portion of the bellows portion 48 is lowered by the protruding portions 64. This can cause a portion of the bellows portion 48 that is located lower than the protruding portions 64 to contract, so that the seat back S2 can be rotated and reclined smoothly without causing a stuck of the connecting tubular portion 43.

Meanwhile, when the seat back S2 is rotated frontward from the position shown in FIG. 13, the cover member 60 is rotated frontward around the axis of the reclining mechanism RL as shown in FIG. 10. This causes the upper end portion of the duct 40 to be rotated together with the seat back frame F2 and the cover member 60. Since the upper end portion of the bellows portion 48 is retained by the protruding portions 64, when the seat back frame F2 and the cover member 60 are rotated frontward, the upper end portion of the bellows portion 48 is lifted up by the protruding portions 64. This can cause the portion of the bellows portion 48 that is located lower than the protruding portions 64 to expand, so that the seat back S2 can be rotated and raised smoothly without stretching the connecting tubular portion 43.

According to this embodiment as described above, since the first engagement portions 110, 210 provided on the bracket 50 include the first elastically deformable portions 113, 213 configured to deform elastically to allow the first stopper portions 112, 212 to pass through the first engagement holes 12A, 12B when the first engagement portions 110, 210 are inserted into the first engagement holes 12A, 12B of the pan frame 12, the bracket 50 and the pan frame 12 can be attached simply to each other by a single motion. Therefore, as compared with an alternative configuration in which the bracket is attached to the pan frame with tapping screws, the workability for attaching the blower 30 to the seat frame F can be improved.

Since the first engagement portions 110, 210 are provided on the bracket 50 by attaching the clips 100, 200 to the bracket 50, as compared with an alternative configuration in which the first engagement portions are formed in one-piece with the bracket, the degree of flexibility in designing the first engagement portions 110, 210 is relatively high. This makes it possible, for example, to make the first engagement portions 110, 210 have shapes that allow easier engagement in the first engagement holes 12A, 12B, so that the workability for attaching the blower 30 to the seat frame F can be improved further.

Since the second engagement portions 120, 220 of the clips 100, 200 include the second elastically deformable portions 123, 223 configured to deform elastically to allow the second stopper portions 122, 222 to pass through the second engagement holes 50A, 50B when the second engagement portions 120, 220 are inserted into the second engagement holes 50A, 50B of the bracket 50, the clips 100, 200 can be attached simply to the bracket 50 by a single motion. Therefore, the first engagement portions 110, 210 can be provided on the bracket 50 in a simple manner.

Since the attachment holes 12H are used as the first engagement holes 12A, 12B, it is not necessary to form the first engagement holes 12A, 12B in the pan frame 12 other than the attachment holes 12H. This can simplify the configuration of the pan frame 12.

Since the car seat S includes the cover member 60 for covering the connecting tubular portion 43 of the duct 40, the duct 40 can be protected by the cover member 60. This can suppress a possibility that, for example, a foot of an occupant seated on the rear seat hits the duct 40. Further, since the cover member 60 restricts the position of the connecting tubular portion 43 as it is fixed to the seat frame F, the motion of the duct 40 can be suppressed by the cover member 60.

Since the motion of the duct 40 can be suppressed by the cover member 60 and thus it is not necessary to provide a member for restricting the motion of the duct 40 other than the cover member 60, the number of parts for the car seat S can be reduced. If the cover member 60 is not provided, for example, a middle portion of the duct 40 (i.e., the connecting tubular portion 43 or another portion adjacent thereto) has to be fixed to the lower frame 24 or another member so as to restrict the motion of the duct 40; however, since the motion of the duct 40 can be suppressed by the cover member 60, the work for fixing the middle portion of the duct 40 can be eliminated. This can improve the workability for assembling the car seat S.

Further, since the cover member 60 is provided for covering the bellows portion 48 that has flexibility and is easy to move and susceptible to damage as compared to other portions when a foot of the occupant seated on the rear seat hits the bellows portion 48, the cover member 60 can efficiently provide the protection of the duct 40 as well as the suppression of the movement of the duct 40.

Since the cover member 60 has protruding portions 64 that protrude inward and contact the connecting tubular portion 43, the movement of the duct 40 can be suppressed further by the contact between the protruding portions 64 and the connecting tubular portion 43.

Since the protruding portions 64 are provided to sandwich the connecting tubular portion 43 at right and left sides of the connecting tubular portion 43, rightward and leftward movements of the duct 40 can be efficiently suppressed by the right and left protruding portions 64.

Since the right and left protruding portions 64 are provided to enter the root portion 48B of the bellows portion 48, the movement of the duct 40 in the lateral direction as well as the movement of the duct 40 in a direction in which the crest portions 48A (the root portions 48B) of the duct 40 are arranged in line (i.e., in the upper-lower direction) can be suppressed. This can further suppress the movement of the duct 40.

Since the cover member 60 has a substantially U-shaped cross-section including the first wall 61 and the pair of second walls 62, the cover member 60 can be formed with a simple structure and provide the protection of the duct 40 as well as the suppression of the movement of the duct 40.

Further, since the cover member 60 is made of a material that is harder than that of the connecting tubular portion 43, the duct 40 can be protected well by the cover member 60.

Although one preferred embodiment of the present invention has been described above, the present invention is not limited to the above-described embodiment. It is to be understood that various changes and modifications may be made to any of the specific configurations where necessary without departing from the gist of the present invention. In the following description, constituent elements similar to those previously described in the above-described embodiment are denoted by the same reference numerals and detailed description thereof will be omitted where appropriate; therefore, constituent elements different from those previously described in the above-described embodiment will be described in detail.

For example, in the above-described embodiment, the first engagement portions 110, 210 are provided on the bracket 50. However, the present invention is not limited to this specific configuration. The first engagement portions may be provided on the pan frame. For example, as described with reference to FIG. 6 (b), the pan frame 12 has a second engagement hole 12A, and the first clip 100 as the attachment member includes a second engagement portion 110 protruding toward the pan frame 12, so that the first clip 100 is attached to the pan frame 12 by the engagement between the second engagement portion 110 and the second engagement hole 12A, thereby providing the first engagement portion 120 on the pan frame 12. In this embodiment, the second stopper portion 112 of the second engagement portion 110 is locked to the pan frame 12. Further, in this embodiment, the first engagement portion 120 is provided to protrude toward the bracket 50, and the bracket 50 has a first engagement hole 50A in which the first engagement portion 120 is engageable. When the first engagement portion 120 is engaged in the first engagement hole 50A, the first stopper portion 122 is locked to the bracket 50.

Further, in this embodiment, the attachment holes 12H (see FIG. 8) formed in the pan frame 12 may be used as the second engagement hole 12A. With this configuration, it is not necessary to form the second engagement hole 12A in the pan frame 12 other than the attachment holes 12H, so that the configuration of the pan frame 12 can be simplified. It should be noted that the first engagement hole and the second engagement hole may be holes that are formed in the pan frame other than the attachment holes.

In the above-described embodiment, the blower 30 is attached to the bracket 50 by the tapping screws 91. However, the present invention is not limited to this specific configuration. For example, as seen in FIG. 14 (a), the blower 30 may be attached to the bracket 50 by clips 300 as an example of attachment members. The clip 300 includes a first engagement portion 310, a second engagement portion 320, and a flange portion 330. The first engagement portion 310 has a first stopper portion 312 and a first elastically deformable portion 313 configured to be elastically deformable, and the second engagement portion 320 has a second stopper portion 322 and a second elastically deformable portion 323 configured to be elastically deformable. The bracket 50 has three projections 59 (see FIG. 14 (b)) that protrude toward the blower 30. Each of the projections 59 has a second engagement hole 50C as a through hole in which the second engagement portion 32 is engageable, and each of the attachment portions 36, 37, 38 of the blower 30 has a third engagement hole 30C as a through hole in which the second engagement portion 320 having been engaged in the second engagement hole 50C is engageable.

The second engagement portion 320 of the clip 300 is engaged in the second engagement hole 50C of the bracket 50, and then the second engagement portion 320 is further engaged in the third engagement hole 30C of the attachment portion 36, 37, 38, so that the blower 30 is attached to the bracket 50. With this configuration, the blower 30 can be attached to the bracket 50 by the clips 300; this can improve the workability for attaching the blower 30 to the seat frame F, for example, as compared with an alternative configuration in which the blower is attached to the bracket by fastening with tapping screws or other fastening members. Further, since the tapping screws or other fastening members for attaching the blower to the bracket are not required, the number of parts for the car seat S can be reduced. Further, the three projections 59 are brought into abutment against the blower 30 when the blower 30 is attached to the bracket 50 by engaging the second engagement portions 320 of the clip 300 in the second engagement holes 50C of the bracket 50 and further in the third engagement holes 30C of the blower 30. Accordingly, the blower 30 is less likely to rattle, so that the stiffness in attachment of the blower 30 can be improved.

Figure 15:
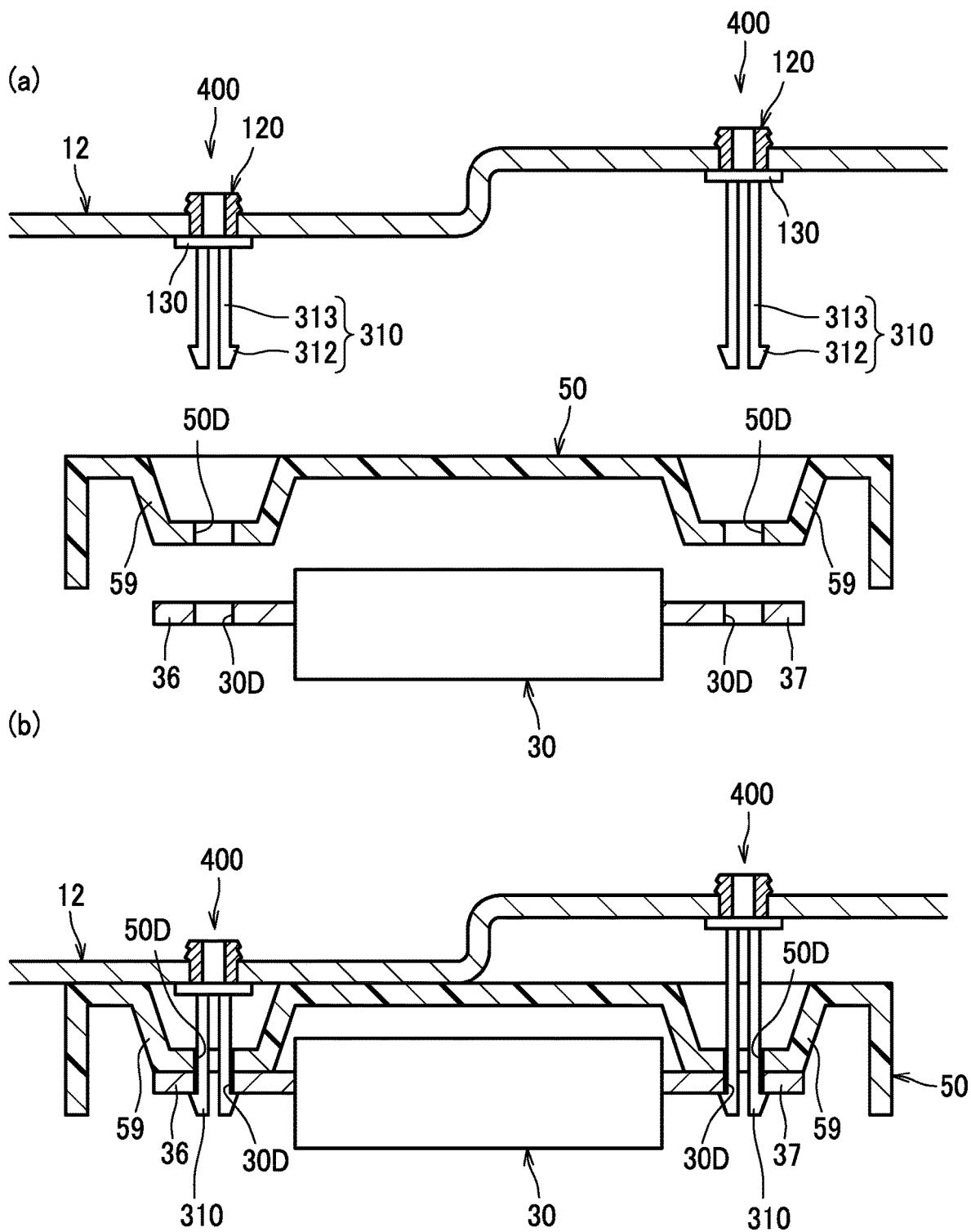
FIG. 15 (a) and FIG. 15 (b) are sectional views of an attachment structure for the blower according to a second modified embodiment, FIG. 16 (a) is a sectional view of an attachment structure for the blower according to a third modified embodiment, and FIG. 16 (b) is a sectional view of an attachment structure for the blower according to a fourth modified embodiment.

Further, as seen in FIG. 15 (a), the blower 30 may be attached to the pan frame 12 together with the bracket 50 with the use of the first engagement portions 310 provided on the pan frame 12. Clips 400 as an example of attachment members are attached to the pan frame 12 so that the first engagement portion 310 is provided on the pan frame 12. The clip 400 includes a first engagement portion 310, a second engagement portion 120, and a flange portion 130. The bracket 50 has three projections 59 (see FIG. 14 (b)) that are protruding toward the blower 30, and first engagement holes 50D formed in the bracket 50 in which the corresponding first engagement portions 310 are engageable. The first engagement holes 50D are through holes, and one first engagement hole 50D is formed in each of the protrusions 59. Further, fourth engagement holes 30D as through holes are formed in the attachment portions 36, 37, 38 of the blower 30 (see FIG. 14 (b)), so that the first engagement portions 310 having been engaged with the first engagement holes 50D are engageable in the fourth engagement holes 30D.

As seen in FIG. 15 (b), the first engagement portion 310 of the pan frame 12 is engaged in the first engagement hole 50D of the bracket 50, and then the first engagement portion 310 is further engaged in the fourth engagement hole 30D of the attachment portion 36, 37, 38, so that the blower 30 together with the bracket 50 is attached to the pan frame 12. With this configuration, the bracket 50 and the blower 30 can be attached to the pan frame 12 by engaging the bracket 50 and the blower 30 with the first engagement portions 310; this can improve the workability for attaching the blower 30 to the seat frame F, for example, as compared with an alternative configuration in which the blower is attached to the seat frame by fastening with tapping screws or other fastening members. Further, since the tapping screws or other fastening members for attaching the blower to the seat frame are not required, the number of parts for the car seat S can be reduced. Further, the three projections 59 are brought into abutment against the blower 30 when the bracket 50 and the blower 30 are attached to the pan frame 12 by engaging the first engagement portions 310 of the pan frame 12 in the first engagement holes 50D of the bracket 50 and further in the fourth engagement holes 30D of the blower 30. Accordingly, the blower 30 is less likely to rattle, so that the stiffness in attachment of the blower 30 can be improved.

Further, in the above-described embodiment, the first engagement portions 110, 210 are provided by attaching the clips 100, 200 as the attachment members to the bracket 50. However, the present invention is not limited to this specific configuration. For example, as seen in FIG. 16 (a), the first engagement portions 50E may be formed in one-piece with the bracket 50 as a portion of the bracket 50 made of plastic. Further, as seen in FIG. 16 (b), the first engagement portions 12E may be formed in one-piece with the pan frame 12 as a portion of the pan frame 12. The first engagement portions 12E may be made, for example, by cutting and raising portions of the pan frame 12 made of sheet metal, followed by bending distal end portions of the cut-raised portions. With this configuration, the number of parts for the car seat S can be reduced.

In the above-described embodiment, three first engagement portions 110, 210 are provided using two kinds of attachment members (specifically, the first clip 100 and the second clip 200). However, the present invention is not limited to this specific configuration. For example, three first engagement portions may be provided using one kind of attachment members. As an alternative, three first engagement portions may be provided using three individually different kinds of attachment members. It should be noted that an arbitrary number of first engagement portions may be employed.

Further, in the above-described embodiment, the connecting tubular portion 43 of the duct 40 includes the bellows portion 48 as the flexible portion. However, the present invention is not limited to this specific configuration. For example, the connecting tubular portion may not include a bellows-like portion (see connecting tubular portion 143 in FIG. 18). As long as the flexible portion has flexibility, the configuration of the flexible portion is not limited to a specific configuration. Further, the connecting tubular portion may not have flexibility.

In the above-described embodiment, the protruding portions 64 of the cover member 60 are provided to enter the root portion 48B of the bellows portion 48. However, the present invention is not limited to this specific configuration. For example, as shown in FIG. 17 (a), the cover member 60 may have protruding portions 65 that are located at right and left sides of the connecting tubular portion 143 and configured to protrude toward the connecting tubular portion 143, and the connecting tubular portion 143 may have recess portions 43A engageable with the protruding portions 65. As an alternative, as seen in FIG. 17 (b), the connecting tubular portion 143 may have protruding portions 43B provided at right and left sides thereof to protrude laterally outward toward the second walls 62 of the cover member 60, and the cover member 60 may have recess portions 66 engageable with the protruding portions 43B. Although the recess portions 66 are formed as through holes extending through the second walls 62 in the lateral direction, each of such recess portions may be formed as a hole with a bottom. With these configurations, the movement of the duct 40 can be suppressed further by the engagement between the protruding portions and the recess portions.

Further, in the embodiment shown in FIG. 17 (a), the recess portions 43A may be grooves as shown in FIG. 18; the grooves extend in the upper-lower direction along which the connecting tubular portion 143 of the duct 40 extends. With this configuration, the duct 40 and the cover member 60 are relatively movable in the upper-lower direction; therefore, the seat cushion and the seat back can be moved smoothly in a movable structure in which one of the seat cushion and the seat back is movable relative to the other one of the seat cushion and the seat back. To be more specific, for example, in a structure in which the seat back is rotatable relative to the rear portion of the seat cushion, even if the cover member 60 rotates upward or downward relative to the duct 40 by the rotation of the seat back, the protruding portions 65 can slide in the recess portions 43A upward or downward; therefore, the seat back can be rotated smoothly. It is more preferable that the direction in which the recess portions 43A extend follows the rotation trajectory of the protruding portions 65. The same can be applied to the recess portions 66 of FIG. 17 (b).

Further, as seen in FIG. 19, instead of the configuration in which the protruding portions of the cover member enter the root portion of the bellows portion or the configuration in which the protruding portions engage with the recess portion of the connecting tubular portion, the duct 40 and the cover member 60 may be configured such that the protruding portions 67 simply contact right and left flat side walls of the connecting tubular portion 143. This configuration also allows the relative movement between the duct 40 and the cover member 60 in a direction in which the duct 40 extends, so that the seat cushion and the seat back can be moved smoothly. It should be noted that the number of protruding portions is arbitrary, and the number of the protruding portions may be different at the right side and at the left side.

In the above-described embodiment, the duct 40 consists of three parts, namely, the cushion tubular portion 41, the back tubular portion 42, and the connecting tubular portion 43 connecting the cushion tubular portion 41 and the back tubular portion 42. However, the present invention is not limited to this specific configuration. For example, the duct may consist of a single part in which the cushion tubular portion 41, the back tubular portion 42, and the connecting tubular portion 43 according to the above-described embodiment are formed in one-piece.

In the above-described embodiment, the cover member 60 covers a part of the connecting tubular portion 43, more specifically, the bellows portion 48 as the flexible portion. However, the present invention is not limited to this specific configuration. For example, the cover member may be provided to cover the entire connecting tubular portion. As an alternative, the cover member may be configured not to cover the entire flexible portion but to cover a part of the flexible portion.

In the above-described embodiment, the cover member 60 is a dedicated member for covering the connecting tubular portion 43 of the duct 40. However, the present invention is not limited to this specific configuration. The cover member may be a member having a function other than the function of covering the connecting tubular portion of the duct. To be more specific, the cover member may be a member, for example, having a function of covering a connecting portion connecting the cushion side frame 11 and the connecting pipe 13 (see FIG. 3) other than the function of covering the connecting tubular portion of the duct. In other words, the cover member configured to cover the connecting portion connecting the cushion side frame 11 and the connecting pipe 13 may also be configured to serve to cover the connecting tubular portion of the duct.

In the above-described embodiment, the cushion side frames 11 have been exemplified as an example of side frames, and the blower 30 is attached to the pan frame 12 connecting the right and left cushion side frames 11. However, the present invention is not limited to this specific configuration. For example, the side frames may be side frames of the seat back, and the blower may be attached to a pan frame connecting the right and left side frames of the seat back.

In the above-described embodiment, the pan frame 12 has been exemplified as an example of the plate portion. However, the present invention is not limited to this specific configuration. For example, the plate portion may be a plate member attached to the pan frame 12 (see FIG. 3). Further, for example, the plate portion may be a plate member attached to seat springs (shown in FIG. 3 without reference numeral) bridging between the pan frame 12 and the connecting pipe 13.

In the above-described embodiment, one blower 30 blows air to the seat cushion S1 and the seat back S2. However, the present invention is not limited to this specific configuration. For example, the car seat may be configured such that a first blower provided under the seat cushion feeds air to the seat cushion and a second blower provided at the seat back feeds air to the seat back. In this modified embodiment, the first blower and the second blower may be attached to the car seat using the configuration of the present invention. As an alternative, one of the first blower and the second blower may be attached to the car seat using the configuration of the present invention, while the other one of the first blower and the second blower may be attached to the car seat using another configuration.

In the above-described embodiment, a sirocco fan has been exemplified as an example of the blower 30. However, the present invention is not limited to this specific configuration. For example, other types of fans such as a propeller fan and a turbo fan may be used instead. Further, in the above-described embodiment, the car seat S is configured to blow out air by the action of the blower 30. However, the present invention is not limited to this specific configuration. For example, the car seat may be configured to suck air by the action of the blower. Further, the blower may be configured such that the rotational direction of the impeller can be reversed to switch between blowing of air and intaking of air.

In the above-described embodiment, the car seat S installed in an automobile has been exemplified as an example of a vehicle seat. However, the present invention is not limited to this specific configuration, and the vehicle seat may be any other vehicle seat installed in other vehicles such as rail cars, aircraft and ships.

Each of the elements explained in the above-described embodiment and modified embodiments may be combined optionally.

The invention claimed is:

1. A vehicle seat comprising:
a seat frame including a plate portion;
a blower having an inlet opening; and
a bracket configured to attach the blower to the plate portion,
wherein one of the bracket and the plate portion is provided with a first engagement portion protruding toward the other one of the bracket or the plate portion,
wherein a first engagement hole in which the first engagement portion is engageable is provided at the other one of the bracket or the plate portion,
wherein the bracket comprises:
a base wall having a first through opening and two or more second through openings, the first through opening being formed in a position corresponding to the inlet opening of the blower, the second through openings being formed around the first through opening, and
wherein the first engagement portion is provided at a rear side of the first through opening, and at least one of the second through openings is located at a front side of the first through opening.

2. The vehicle seat according to claim 1, further comprising:
an attachment member that comprises the first engagement portion and a second engagement portion, the second engagement portion protruding toward the one of the bracket and the plate portion,
wherein the first engagement portion comprises:
a first stopper portion configured to be locked to the other one of the bracket or the plate portion when the first engagement portion is engaged in the first engagement hole, and
a first elastically deformable portion configured to deform elastically to allow the first stopper portion to pass through the first engagement hole when the first engagement portion is inserted into the first engagement hole,
wherein the one of the bracket or the plate portion has a second engagement hole in which the second engagement portion is engageable, and
wherein the first engagement portion is provided on the one of the bracket or the plate portion when the second engagement portion is engaged in the second engagement hole to attach the attachment member to the one of the bracket or the plate portion.

3. The vehicle seat according to claim 2, wherein the second engagement portion comprises:
a second stopper portion configured to be locked to the one of the bracket or the plate portion when the second engagement portion is engaged in the second engagement hole; and
a second elastically deformable portion configured to deform elastically to allow the second stopper portion to pass through the second engagement hole when the second engagement portion is inserted into the second engagement hole.

4. The vehicle seat according to claim 2, wherein the second engagement hole is a through hole formed in the bracket, and
wherein the blower has a third engagement hole engageable with the second engagement portion having been engaged in the second engagement hole.

5. The vehicle seat according to claim 4, wherein the bracket has three projections protruding toward the blower, and
wherein the second engagement hole is formed in each of the projections.

6. The vehicle seat according to claim 1, wherein the first engagement portion is formed in one-piece with the one of the bracket or the plate portion.

7. The vehicle seat according to claim 1, wherein the first engagement portion is provided on the plate portion, and the first engagement hole is a through hole formed in the bracket, and
wherein the blower has a fourth engagement hole engageable with the first engagement portion having been engaged in the first engagement hole.

8. The vehicle seat according to claim 7, wherein the bracket has three projections protruding toward the blower, and wherein the first engagement hole is formed in each of the projections.

9. The vehicle seat according to claim 1, wherein the plate portion has a plurality of attachment holes for attachment of members, and
   wherein one of the attachment holes is used as the first engagement hole.

10. The vehicle seat according to claim 2, wherein the plate portion has a plurality of attachment holes for attachment of members, and
    wherein one of the attachment holes is used as the second engagement hole.

11. The vehicle seat according to claim 1,
    wherein the seat frame comprises:
       frameworks of a seat cushion and a seat back,
    wherein the seat cushion includes a first air flow passage,
    wherein the seat back includes a second air flow passage,
    wherein the vehicle seat further comprises a duct connecting the first air flow passage and the second air flow passage to the blower,
    wherein the duct includes a connecting tubular portion disposed to bridge between the seat cushion and the seat back, and
    wherein the vehicle seat further comprises:
       a cover member, the cover member being configured to cover at least a part of the connecting tubular portion and to be fixed to the seat frame so that a position of the connecting tubular portion is restricted by the cover member.

12. The vehicle seat according to claim 11, wherein the connecting tubular portion includes a flexible portion having flexibility, and
    wherein the cover member is provided to cover at least a part of the flexible portion.

13. The vehicle seat according to claim 11, wherein the cover member comprises a protruding portion, the protruding portion being configured to protrude inward toward the connecting tubular portion that is disposed in an inner space of the cover member, so that the protruding portion contacts the connecting tubular portion.

14. The vehicle seat according to claim 13, wherein the protruding portion is provided on each right and left side of the connecting tubular portion so as to sandwich the connecting tubular portion therebetween.

15. The vehicle seat according to claim 14, wherein the connecting tubular portion includes a bellows portion comprises crest portions and root portions that are alternately formed one after another, and
    wherein the protruding portion is provided to enter one of the root portions.

16. The vehicle seat according to claim 11, wherein one of the cover member or the connecting tubular portion has protruding portions located on right and left sides of the connecting tubular portion and configured to protrude toward the other one of the cover member or the connecting tubular portion, and
    wherein the other one of the cover member or the connecting tubular portion has recess portions in which corresponding protruding portion are engageable.

17. The vehicle seat according to claim 16, wherein each of the recess portions has a groove-shape extending in a direction in which the duct extends.

18. The vehicle seat according to claim 11, wherein the cover member comprises a first wall disposed such that the connecting tubular portion is sandwiched between the first wall and the seat frame, and a pair of second walls extending from right and left ends of the first wall toward the seat frame.

19. The vehicle seat according to claim 11, wherein the cover member is made of a material harder than a material of the connecting tubular portion.

20. The vehicle seat according to claim 1, wherein a second engagement portion protruding towards the bracket is provided on the plate portion, and
    wherein the at least one of the second through openings comprises a second engagement hole in which the second engagement portion is engageable.

* * * * *